United States Patent [19]
Sakamoto et al.

[11] Patent Number: 5,668,659
[45] Date of Patent: Sep. 16, 1997

[54] OPTICAL FIBERS FOR OPTICAL AMPLIFIERS

[75] Inventors: Tadashi Sakamoto; Terutoshi Kanamori; Makoto Yamada; Makoto Shimizu; Yasutake Ohishi; Shoichi Sudo, all of Mito, Japan

[73] Assignee: Nippon Telegraph and Telephone Corporation, Tokyo, Japan

[21] Appl. No.: 533,498

[22] Filed: Sep. 25, 1995

[30] Foreign Application Priority Data

Sep. 27, 1994 [JP] Japan .................... 6-231348
Jun. 21, 1995 [JP] Japan .................... 7-154504

[51] Int. Cl.$^6$ .................... H01S 3/00
[52] U.S. Cl. .................... 359/341; 372/6
[58] Field of Search .................... 372/6, 41; 385/115, 385/127, 142; 359/341

[56] References Cited

U.S. PATENT DOCUMENTS

| | | | |
|---|---|---|---|
| 4,923,279 | 5/1990 | Ainslie et al. | 350/96.3 |
| 5,299,210 | 3/1994 | Snitzer et al. | 372/6 |
| 5,412,672 | 5/1995 | Ainslie et al. | 372/6 |

FOREIGN PATENT DOCUMENTS

| | | |
|---|---|---|
| 4-311930 | 4/1992 | Japan . |
| 6-48769 | 2/1994 | Japan . |
| 6-48770 | 2/1994 | Japan . |
| 6-112576 | 4/1994 | Japan . |

OTHER PUBLICATIONS

"Effective Codopant Ions for 1/4μm-band Tm-doped ZBLAN Fiber Amplifiers" Sakamoto et al., NTT Opto-electronics Laboratories, The Institute of Electronics Information and Communications Engineers, Tech. Report 1994, pp. 67–72.

"Design of a 1.65μm-Band Optical Time-Domain Reflecto-Meter" Takasugi et al., Journal of Lightwave Technology vol. 11, No. 11, Nov. 1993, pp. 1743–1748.

"Thulium Doped Terbium Sensitised CW Fluoride Fibre Laser Operating On the 1.47μm Transition" Percival et al., Electronics Letters, 10th Jun. 1993, vol. 29, No. 12, pp. 1054–1056.

IEICE Technical Report, vol. 90, No. 206, pp. 88–95, "Optical Properties of Tm-doped Glass Fibers", Izumi Sankawa et al.

*Primary Examiner*—Mark Hellner
*Attorney, Agent, or Firm*—Spencer & Frank

[57] ABSTRACT

An amplifying optical fiber includes a core containing Tm ions as activation ions and a clad containing at least one of Tb ions and Eu ions. Alternatively, the amplifying optical fiber includes a core composed of more than two layers. Tm is contained in more than one of the more than two layers as activation ions and at least one of Tb ions and Eu ions is contained in more than one of the more than two in which Tm is not contained.

4 Claims, 19 Drawing Sheets

ABSORPTION SPECTRUM OF Tb ION

ABSORPTION SPECTRUM OF Eu ION

ABSORPTION SPECTRUM OF Ho ION

ABSORPTION SPECTRUM OF Nd ION

ABSORPTION SPECTRUM OF Dy ION

ABSORPTION SPECTRUM OF Sm ION

OPTICAL FIBERS FOR OPTICAL AMPLIFIERS

BACKGROUND OF THE INVENTION

1. Field of the Invention

The present invention relates to a light amplifying optical fiber for an optical fiber amplifier which is used for optical communication.

2. Description of the Prior Art

An optical fiber amplifier is considered a key device for an optical communication system at present and research and development is proceeding. Specifically, research is being performed using as activation ions Pr ions in the 1.3 μm band and Er ions in the 1.5 μm band which are optical signal wavelength bands used for optical communication.

In the constitution of an optical communication system using signal light in the 1.3 μm or 1.5 μm band, optical monitoring systems have been proposed in which 1.65 μm band light is used for monitoring an optical fiber as an optical transmission line. One proposal is described by Y. Koyamada et al. in "Basic Concepts for Fiber Optic Subscriber Loop Operation Systems" (Proceedings of ICC, 341.1, 1990, pp.1541–1544). If the optical monitoring system is used, it is possible to monitor the optical transmission line without stopping the signal light because light having a different wavelength from that of the signal light is used as a probe light. However, there is no semiconductor laser having a high output power which can used as a light source for such a monitoring system. For this reason, a method is proposed in which the output of an existing semiconductor laser is amplified. Also, there is a need for a 1.65 μm band optical fiber amplifier which can be used for the optical monitoring system.

Conventionally, a 1.65 μm band optical fiber amplifier is proposed in which Tm ions are used as the activation ions. For instance, there is "Various Characteristics of Tm-doped Optical Fiber" by Izumi Sankawa, (IEICE Technical Study Report OQE90-85, pp. 89–94). The reason why Tm ions are best as the activation ions in the 1.65 μm band optical fiber is that Tm has energy levels as shown in FIG. 1. That is, when a Tm ion in the $^3H_6$ level (ground state) is excited to the $^3F_4$ level, the stimulated transition occurs from the $^3F_4$ level to the $^3H_6$ level so that light emission having the wavelength of 1.65 μm can be obtained. Pump light having wavelengths of 0.7 μm, 0.8 μm, 1.2 μm, and 1.55 μm to 1.6 μm can be used for excitation of Tm ions as shown in the figure. When pump light of 1.55 to 1.6 μm is used, the Tm ions in the $^3H_6$ level can be directly excited to the $^3F_4$ level. When pump light of 0.8 μm is emitted from a device which can be relatively readily available, the Tm ion in the $^3H_6$ level is excited to the $^3H_4$ level and relaxed from the $^3H_4$ level to the $^3F_4$ level. This means that the Tm ion is excited to the $^3F_4$ level. As a result, the light emission of 1.65 μm can be obtained through the stimulated transition of $^3F4 \rightarrow ^3H_6$.

An optical amplifier can be obtained if a typical optical amplifier is constituted using a Tm-doped optical fiber in which the three-level stimulated emission of $^3F_4 \rightarrow ^3H_6$ can be utilized, as shown in FIG. 2. The optical fiber amplifier includes a light amplifying optical fiber 1 in which Tm is doped in the core, an optical fiber 2 for signal input, a pump light source 3, a wavelength multiplexer 4 for combining a signal light 2A and pump light 3A supplied from the pump light source 3 for supply to the amplifying optical fiber 1, and a signal light outputting optical fiber 6 for outputting the signal light amplified by the optical fiber 1. Note that in the optical fiber amplifier, an optical isolator 5 may be provided between the light amplifying optical fiber 1 and the signal light outputting optical fiber 6 as necessary.

Absorption spectrum and spontaneous emission spectrum (fluorescent spectrum) as a result of the stimulated emission transition ($^3F_4 \rightarrow ^3H_6$) when Tm ions are used as the activation ions in the above optical fiber amplifier are shown in FIG. 3. In the figure, the reference numeral 8 indicate a curve representative of an absorption cross section, and the reference numeral 9 indicates a curve representative of emission cross section. In a case of using this transition, a wavelength at the center of the spontaneous emission spectrum is in the vicinity of 1.8 μm as shown in FIG. 3. Also, a wavelength at the center of the absorption spectrum is 1.65 μm. As seen from these values, much of the pumping energy is used for amplified spontaneous emission (ASE) in the 1.8 to 2.0 μm band. For this reason, the amount of pumping energy is reduced which contributes to amplification of light having the wavelength of 1.65 μm as a target wavelength. Further, a laser oscillation is readily caused because the gain of single traveling path is high in the 1.8 to 2.0 μm band. Once the laser oscillation is caused, the gain cannot be increased in the 1.65 μm band even if the pump light is further inputted.

Conventionally, Tm-doped optical amplifiers are known. Also known are an optical amplifier in which co-doping ions are used as a donor or sensitizer (Japanese Patent Application Laid-Open No. 112576/1994 by Ooishi et al.) and an optical amplifier in which co-doping ions are used as an acceptor (by R. M. Percival et al., "THULIUM DOPED TERBIUM SENSITISED CW FLUORIDE FIBER LASER OPERATING ON THE 1.47 μm TRANSITION", Electron. Lett. Vol. 29, No.12, (1993), pp. 5054–1056. See also Sakamoto et al., "THE EFFECT OF CO-DOPED IONS IN THE 1.4 m BAND Tm DOPED ZBLYAN OPTICAL FIBER AMPLIFIER", Shingaku Gihou LQE 94-12).

A summary of the Laid-Open Japanese Patent Application 112576/1994 is as follows. In order to cause optical amplification laser oscillation in the 1.6 to 2.0 μm band ($^3H_4 \rightarrow ^3H_6$) by effectively exciting Tm in the optical fiber, it is desirable to excite with 1.2 μm light. However, a high output laser emitting light having a wavelength of 1.2 μm is not readily available. For this reason, as shown in FIG. 4, ions such as Yb, Er and Dy are doped in the optical fiber together with Tm ions and these co-doped ions are excited by a 1.06 μm high output Nd:YAG laser or a high output semiconductor laser for a 0.98 μm band. The excited co-doped ions transfer energy to the $^3H_5$ level of Tm with no light emission. As a result, 1.6 to 2.0 μm optical amplification laser oscillation is made possible.

The summary of the latter references by Percival et al. and Sakamoto et al. is as follows. As shown in FIG. 5, the transition of $^3H_4 \rightarrow ^3F_4$ is used for 1.4 μm band amplification. A fluorescent life time is long in the $^3F_4$ level as a lower level. For this reason, many ions are excited to the $^3F_4$ level and as a result of this it is difficult to form an inverted population. Accordingly, by doping ions of Tb, Ho and Eu in the optical fiber together with Tm ions, the energy is moved from the $^3F_4$ level to levels of such ions through a non-emission mechanism. As a result, the number of ions trapped in the $^3F_4$ level is decreased, so that it is made possible to form the inverted population. The latter structure aims at the amplification of light having the wavelength of not 1.65 μm but 1.4 μm. Both references are characterized in that the density in a specific energy level of Tm is increased or decreased by use of co-doped ions. On the other hand, in the present invention, the density in a specific energy level is not increased or decreased by doping such ions. Therefore, the present invention is essentially different from the above two references in that the co-doped ions only function to absorb light.

Note that in the references, there are cases in which the energy level $^3F_4$ and $^3H_4$ are labeled reversely with respect to each other, but the relationship between energy levels is not changed substantially in any case.

Alternatively, a light amplifying optical fiber is proposed in Japanese Patent Application Laid-Open No. 311930/1992) in which ions for absorbing a part the spectrum emitted through the stimulated emission of activation ions in the optical fiber are doped in a region where no activation ions are present or where less activation ions are doped. However, in this proposed light amplifying optical fiber, Nd ions as the activation ions and Yb ions, Sm ions or V ions as the absorption ions are used. Therefore, the present invention is different from the proposal in that the target wavelength is the 1.3 μm band and the wavelength absorbed by Yb, Sm, U is the 1.05 μm band which is not the wavelength being amplified. That is, the proposal is different from the present invention in both object and composition.

SUMMARY OF THE INVENTION

An object of the present invention is to provide a light amplifying optical fiber which can realize high efficiency optical amplification of light in the 1.65 μm band through a mechanism different from the conventional one.

According to a first aspect of the present invention, there is provided an amplifying optical fiber which contains Tm ions as activation ions in the core and at least one of Tb ions and Eu ions in the clad.

According to a second aspect of the present invention, there is provided an amplifying optical fiber having a core composed of more than two layers, wherein Tm ions as activation ions are contained in more than one of the layers and at least one of Tb ions and Eu ions is contained in more than one of the layers which does not contain Tm ions.

According to a third aspect of the present invention, there is provided an amplifying optical fiber in which Tm of α ppmw is contained in the core and Tb is doped in the clad which has a confinement factor η at 1.65 μm employing $(1.8 \times \alpha)/(1-\eta)$ (ppmw) as an upper limit, where α is the amount of doped Tm ions and the confinement factor η indicates the ratio of light confined in the core and is represented by $\eta = 1 - \exp(-(a/w^2)$ $$w = a \times (0.46 + 1.629 \, V^{-1.5} + 2.879 \, V^{-6})$$

when the specific refraction index of the optical fiber is Δn, the core diameter is a, the refraction index of the core glass is $n_1$, the wavelength of input light is λ, and a normalized frequency $V \, (= 2 \, \pi n_1 a \, (2\Delta n)^{1/2}/\lambda)$.

Note that above formula which gives η is induced from a formula that is well-known as the confinement factor when a mode of light transmitting through an optical fiber is assumed to be Gaussian mode (ex. Michel J. F. Digonnet "Closed-Form Expressions for the Gain in Three- and Four-Level Laser Fibers" IEEE J. of Quantum Electronics Vol. 26, No.10(1990) pp.1788–1796).

According to a fourth aspect of the present invention, there is provided an amplifying optical fiber comprising a core containing Tm ions as activation ions which provide an absorption spectrum having 1.65 μm as a center wavelength and a spontaneous emission spectrum having 1.8 μm as a center wavelength, and a clad containing at least one of Tb ions, Eu ions, Ho ions, Dy ions, Sm ions and Nd ions as ions directly absorbing said spontaneous emission spectrum having 1.8 μm as the center wavelength.

According to a fifth aspect of the present invention, there is provided an amplifying optical fiber comprising a core composed of more than two layers and a clad surrounding said core having a refraction index lower than that of said core, and wherein Tm is contained in more than one of said more than two layers to provide a spontaneous emission spectrum having 1.8 μm as a center wavelength and an absorption spectrum having 1.65 μm as a center wavelength through stimulated emission transition by pump light, and wherein at least one of Tb ions, Eu ions, Ho ions, Dy ions, Sm ions and Nd ions is contained in more than one of said more than two layers in which Tm is not contained, as ions directly absorbing said spontaneous emission spectrum having 1.8 μm as the center wavelength.

The present invention will be described below.

FIGS. 6 to 11 are spectrum diagrams showing the absorption spectrum of Tb, Eu, Ho, Nd, Dy and Sm ions, respectively. In FIGS. 6 to 11, Tb, Eu, Ho, Nd, Dy and Sm have absorption characteristics in the vicinity of a 1.8 μm band, respectively. By doping at least one of Ho, Eu, Tb, Nd, Dy and Sm ions as absorbent ions in the core or clad of the optical fiber, light in a range of the 1.8 μm band to 2.0 μm are absorbed by these ions. For this reason, the following two effects can be obtained. (1) It can be suppressed that the ASE intensity becomes large, that is, the exciting energy is used for the growth of ASE. As a result, high efficiency amplification can be accomplished in the 1.65 μm band. (2) Laser oscillation can be also suppressed in the 1.8 μm band the 2.0 μm band. Therefore, a phenomenon can be prevented in which the gain in the 1.65 μm band cannot be increased even if the pump light intensity is increased.

In a case where absorbent ions are doped in the clad, a case where absorbent ions are doped in the core, and a case where a core structure is employed which has more than two layers in which absorbent ions and activation of Tm are separately doped, the following advantages are obtained.

In a case where at least one of Ho, Eu, Tb, Nd, Dy and Sm ions as absorbent ions is doped in the clad, the light soaking out to the clad, i.e., an evernescent field can be absorbed. For this reason, there is no cross relaxation between Tm ions and each of these ions and the amplification efficiency does not decrease because of reduction of the life time of the upper level of Tm. However, this method cannot be applied to a fiber such as a multi-mode fiber in which light does not almost soak out to the clad.

In a case where at least one of Tb, Eu, Ho, Dy, Sm and Nd ions is doped in the core as absorbent ions, the amplification efficiency decreases because the life time of the upper level of Tm is decreased due to the cross relaxation between Tm ions and each of these ions. However, since the absorbent ions are doped in the core in which light is most confined such that the effect of absorption becomes great, high efficiency amplification can be expected.

In a case where in an optical fiber having the structure of a core composed of more than two layers, Tm ions are doped in more than one layer and at least one of Ho, Eu, Tb, Nd, Dy and Sm ions is doped in the other more than one layer, the amplification efficiency does not decrease because Tm ions and absorbent ions can be doped without cross relaxation. Further, since the absorbent ions are doped in the core in which light is confined, the effect of absorbent ions can be expected to be sufficient. Specifically, in a case of single mode propagation when Tm ions are doped in the central layer, high efficiency amplification can be expected because the pump light is coupled to Tm ions in a region where the pump light intensity is the strongest. The method can be applied even to optical fibers such as multi-mode fiber in which light does not almost soak out to the clad. However, in manufacturing a fiber having this structure, the manufacturing process is complicated and loss in the fiber is readily caused.

FIG. 12 shows a dependency of gain to fiber length when in the amplifying optical fiber according to the present invention, the pump light intensity is 70 mW, Tm ions of 2000 ppmw (0.2 wt %) are doped in the core, and Tb of 0 ppmw (0 wt %), 2000 ppmw (0.2 wt %), 4000 ppmw (0.4 wt %) and 6000 ppmw (0.6 wt %) are doped in the clad. The core diameter of the optical fiber is 1.8 μm, the specific refraction index difference is 3.7%, and the ratio that light is confined in the core is $\eta=0.4$.

As seen from FIG. 12, high gains can be obtained when Tb of 0.2 and 0.4 wt % are doped, compared to when Tb of 0 wt % is doped. However, when Tb of 0.6 wt % is doped, the gain is decreased. This is because by doping Tb, ASE is suppressed in the 1.75 μm to 2.0 μm band so that the gain is increased when Tb ions of 0.2 wt % and 0.4 wt % are doped, but the gain is decreased due to the loss of signal light by Tm ions when a large amount of Tb ions of 0.6 wt % are doped. As described above, it can be understood that doping Tb ions to achieve high gain is effective but there is an optimal value.

When the maximum gains are plotted from FIG. 12 taking an amount of doped Tb ions as abscissa, the result shown in FIG. 13 can be obtained. That is, in a case where Tm ions of 2000 ppmw are doped in the core and $\eta=0.4$, the region where the effect due to Tb ions can be obtained is $0<Tb\leq 6000$ ppmw. Further, the region where the effect is remarkable is $2000<Tb\leq 4000$ ppmw.

To generalize this result, the following relations are used.

The optimal amount of Tb ions is increased as the amount of doped Tm ions is increased (i.e., there is a proportional relation), and Tb ions need to be doped more as the ratio of light soaking out to the clad—is decreased (there is an inverse proportional relation). The region where the effect of Tb ions can be obtained is $$0<Tb\leq 1.8\alpha/(1-\eta)$$

where $\alpha$ is the amount of doped Tm ions and $1-\eta$ is the ratio of light soaking out to the clad. Further, the region where the remarkable effect can be obtained is $$0.6\alpha/(1-\eta)\leq Tb\leq 1.2\alpha/(1-\eta)$$

As described above, in the conventional light amplifying optical fiber using Tm ions, a mechanism is employed in which the density of a specific energy level of Tm ion is increased or decreased using co-doped ions. On the other hand, in the present invention, a mechanism is employed in which light by spontaneous emission is absorbed without passing through the non-emission process. In this manner, the light amplifying optical fiber of the present invention is essentially different infunction from the conventional light amplifying optical fiber using Tm ions.

The above and other objects, effects, features and advantages of the present invention will become more apparent from the following description of embodiments thereof taken in conjunction with the accompanying drawings.

DETAILED DESCRIPTION OF PREFERRED EMBODIMENTS

The embodiments of the present invention will be described below in detail with reference to the accompanying drawings. The present invention is not limited to these embodiments, as a matter of course.

EMBODIMENT 1

In the embodiment 1, a fluoride glass fiber was used in which Tm of 2000 ppm and Tb of 2000 ppm were doped to a core and clad, respectively. Because Tb represents absorption over 1.6 μm to 2.0 μm and has a very great absorption in a 1.8 μm band, it is effective to suppress ASE and laser oscillation although optical loss increases somewhat at 1.65 μm. In a case that Tm and Tb are separately doped to the core and the clad, respectively, there is no cross relaxation between Tm and Tb. Therefore, high efficiency amplification is made possible.

A single mode fiber (ZBLYALN fiber) having the glass composition of $ZrF_4$—$BaF_2$—$LaF_3$—$YF_3$—$AlF_3$—$LiF$—$NaF$ was used as the fluoride glass fiber. The respective mole ratios in the fiber were 56 mol % in $ZrF_4$, 14 mol % in $BaF_2$, 3.5 mol % in $LaF_3$, 2 mol % in $YF_3$, 7 mol % in $AlF_3$, 2.5 mol % in LiF, and 15 mol % in $PbF_2$. The refractive index of this glass when a sodium D line was used was 1.5532. The respective mole ratios in the clad glass were 47.5 mol % in $ZrF_4$, 23.5 mol % in $BaF_2$, 2.5 mol % in $LaF_3$, 2 mol % in $YF_3$, 4.5 mol % in $AlF_3$, and 20 mol % in NaF. The refractive index of this glass when a sodium D line was used was 1.49552. The fiber had a specific refraction index difference of 3.7%. The fiber was chosen to be 8 m in length and 2.0 μm in core diameter such that the maximum gain could be obtained.

In this case, about 50% of the light of the 1.65 μm band was confined in the core and the remained portion soaked out to the clad. About 40% of the light of 1.8 the μm band was confined in the core and the remaining portion soaked out to the clad.

Figure 1:
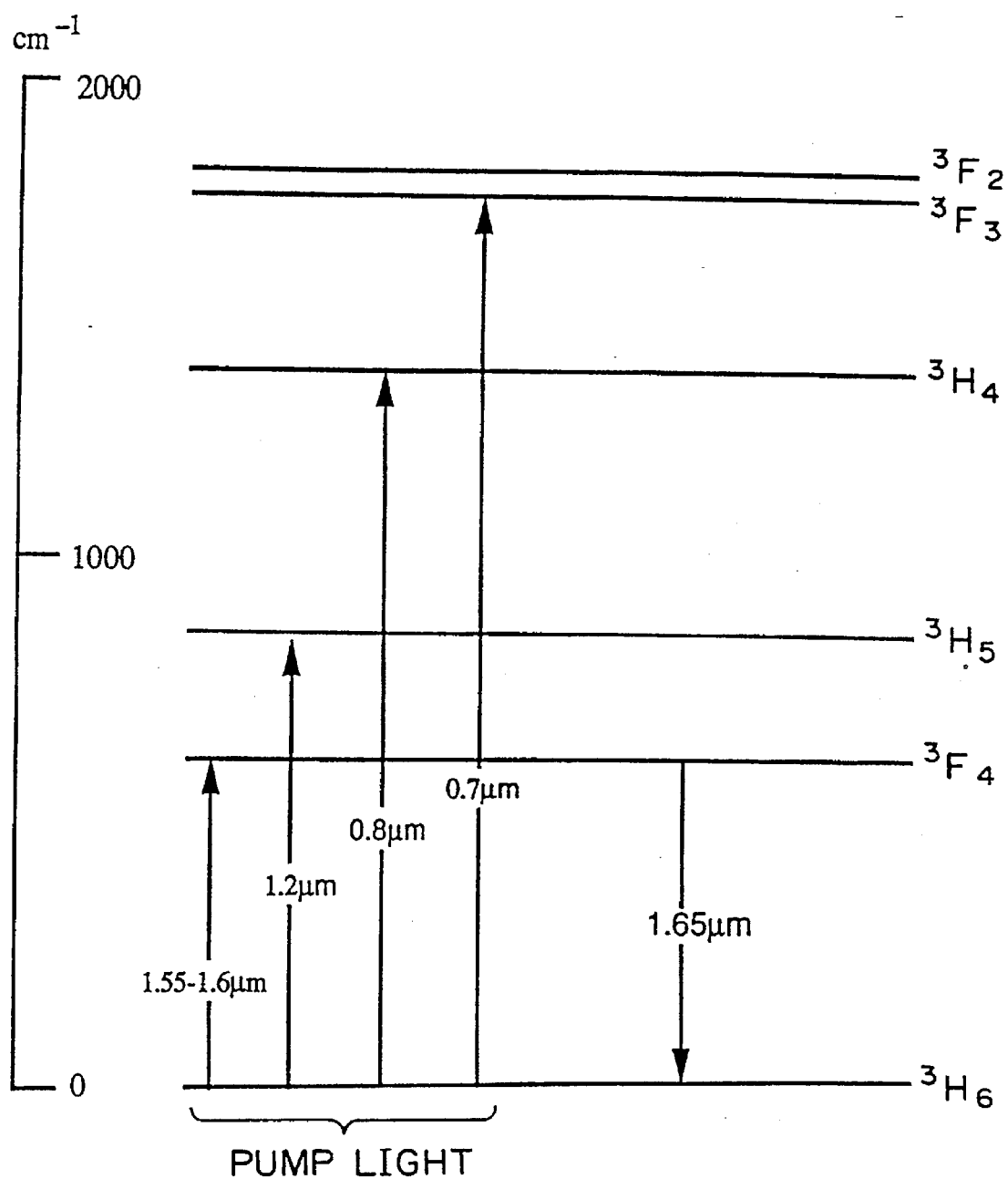
FIG. 1 is a diagram showing the energy levels of Tm.
Figure 2:
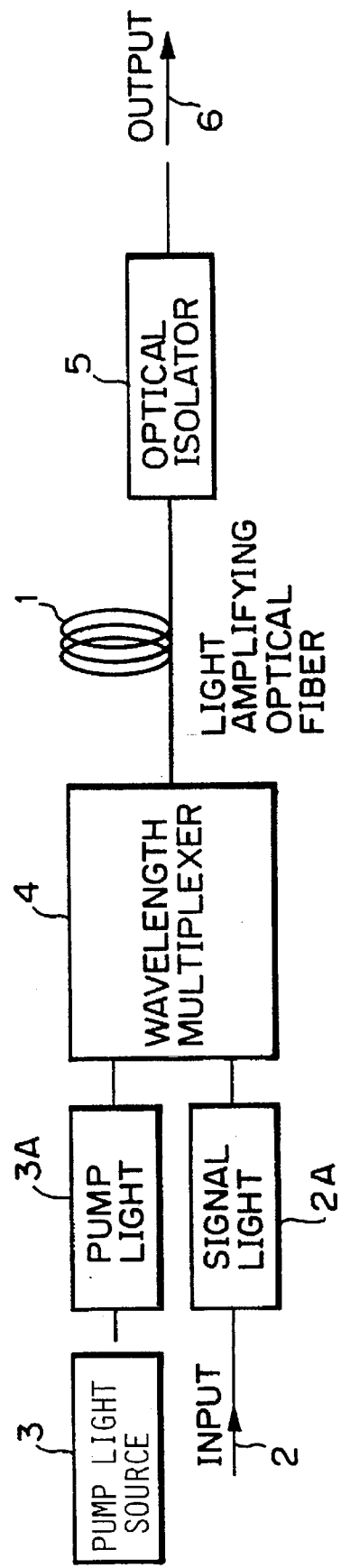
FIG. 2 is a structural diagram showing a typical optical fiber amplifier.
Figure 3:
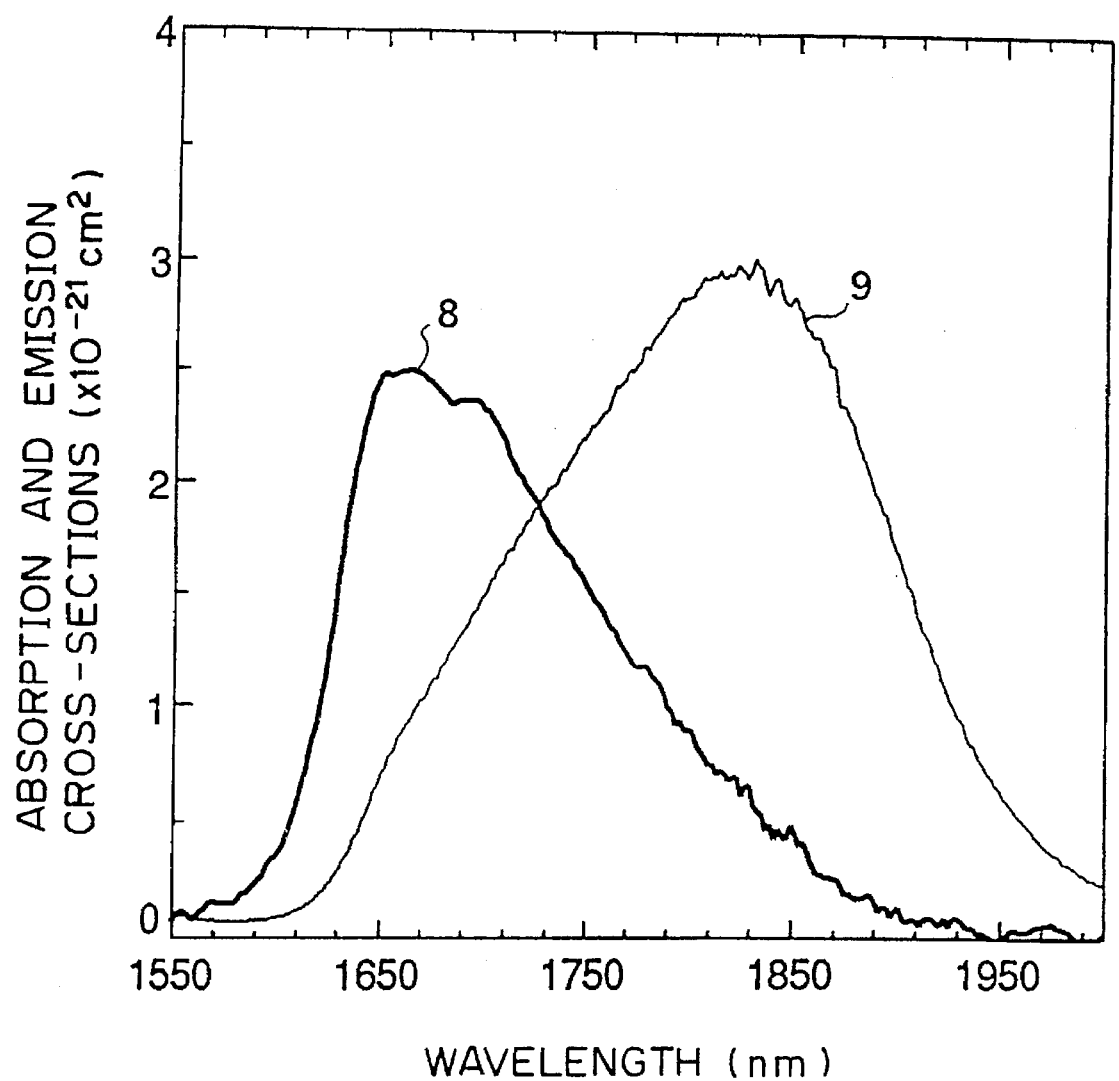
FIG. 3 is a spectrum diagram showing the absorption spectrum and fluorescent spectrum in the transition of an activation ion Tm from the $^3F_4$ level to the $^3H_6$ level.
Figure 4:
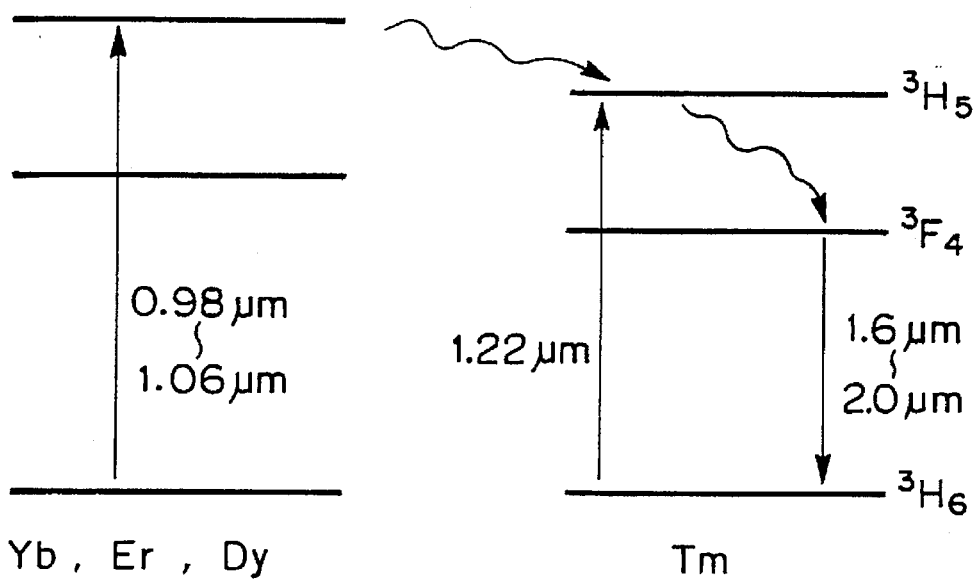
FIG. 4 is an energy level diagram for explaining the mechanism of a conventional light amplifying optical fiber.
Figure 5:
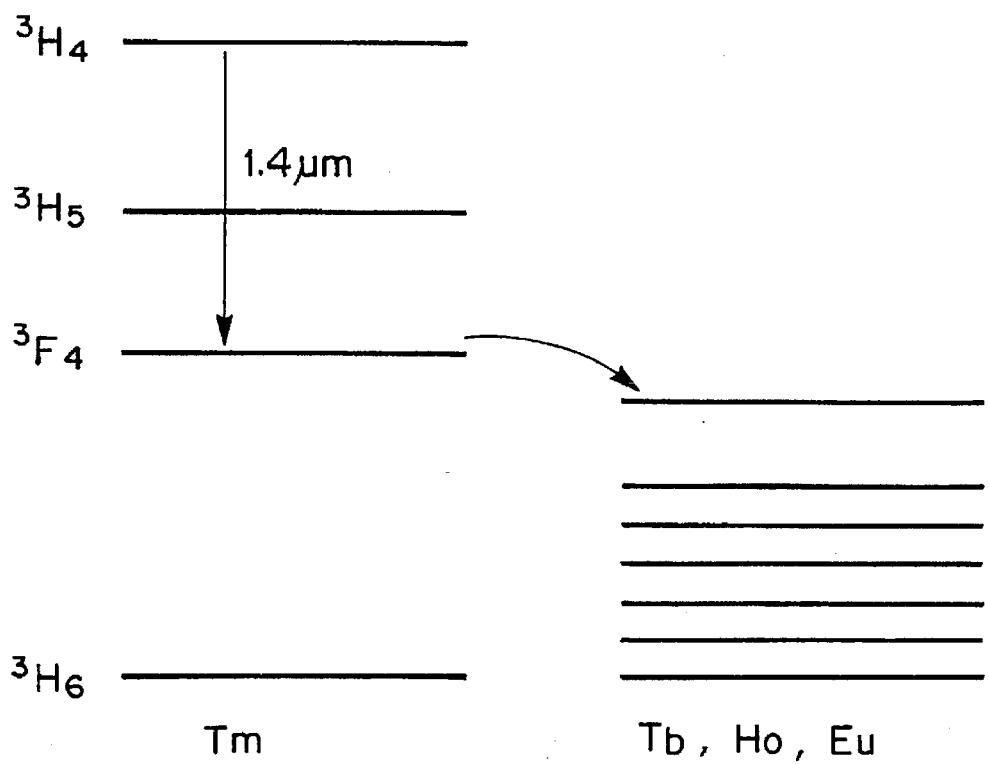
FIG. 5 is an energy level diagram for explaining the mechanism of another conventional light amplifying optical fiber.
Figure 6:
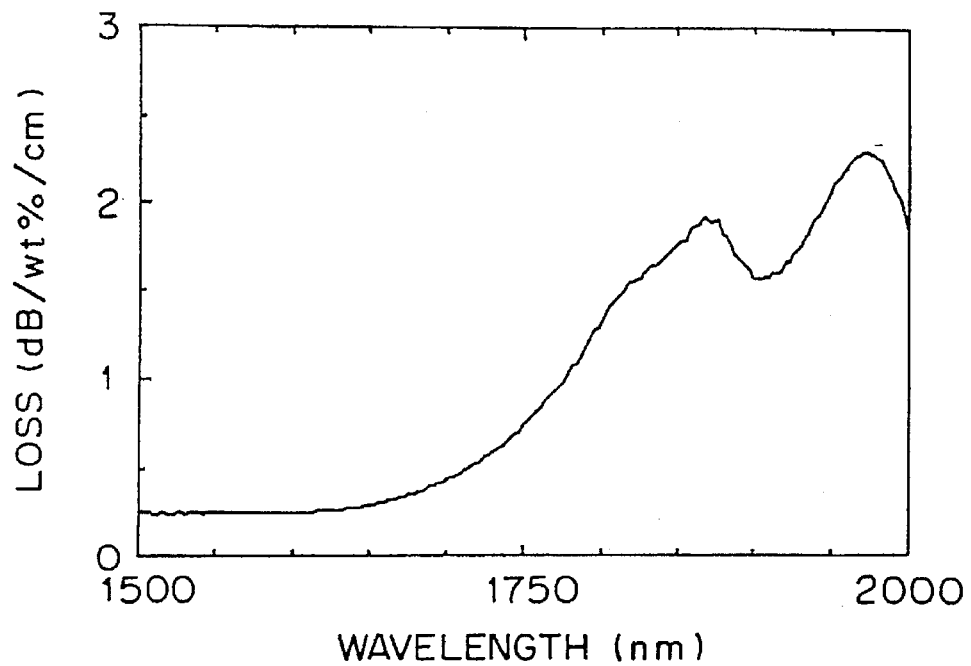
FIG. 6 is a spectrum diagram showing the absorption spectrum of the Tb ion.
Figure 7:
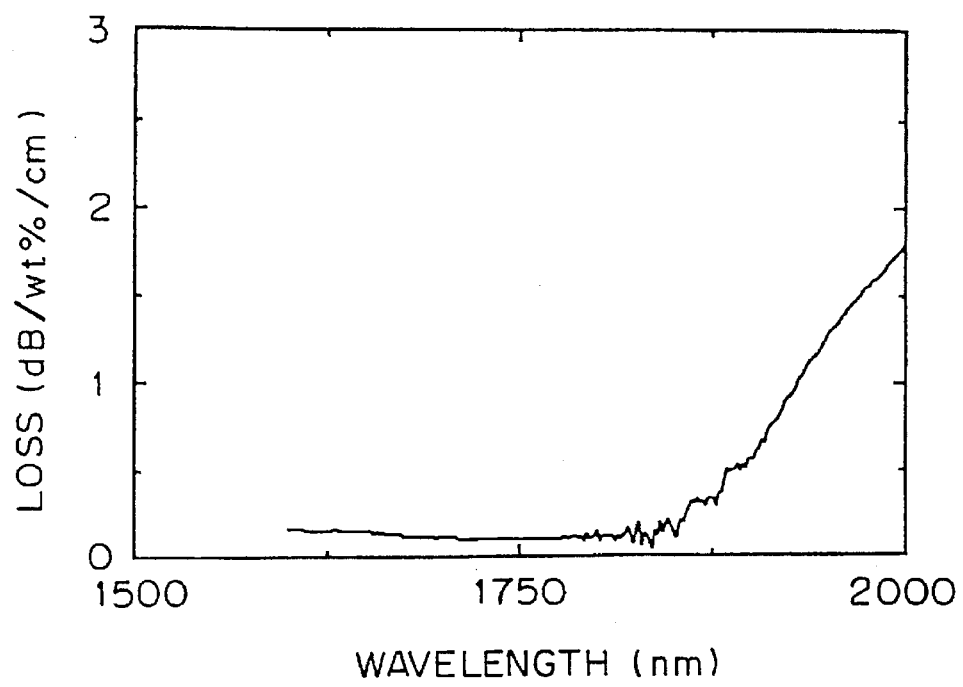
FIG. 7 is a spectrum diagram showing the absorption spectrum the Eu ion.
Figure 8:
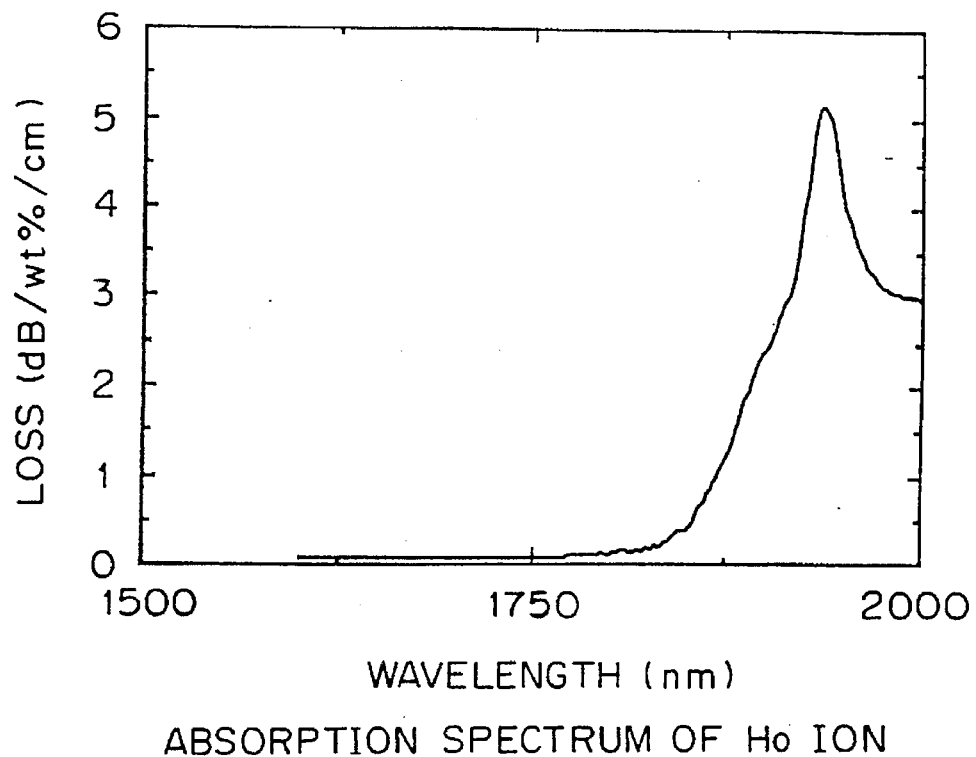
FIG. 8 is a spectrum diagram showing the absorption spectrum of the Ho ion.
Figure 9:
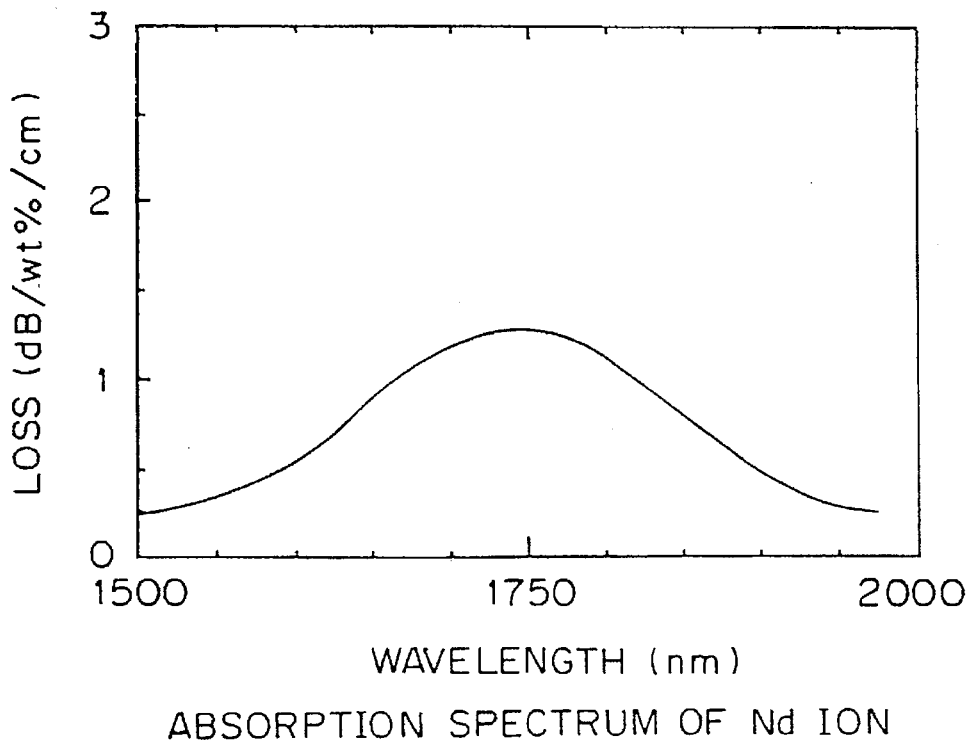
FIG. 9 is a spectrum diagram showing the absorption spectrum of the Nd ion.
Figure 10:
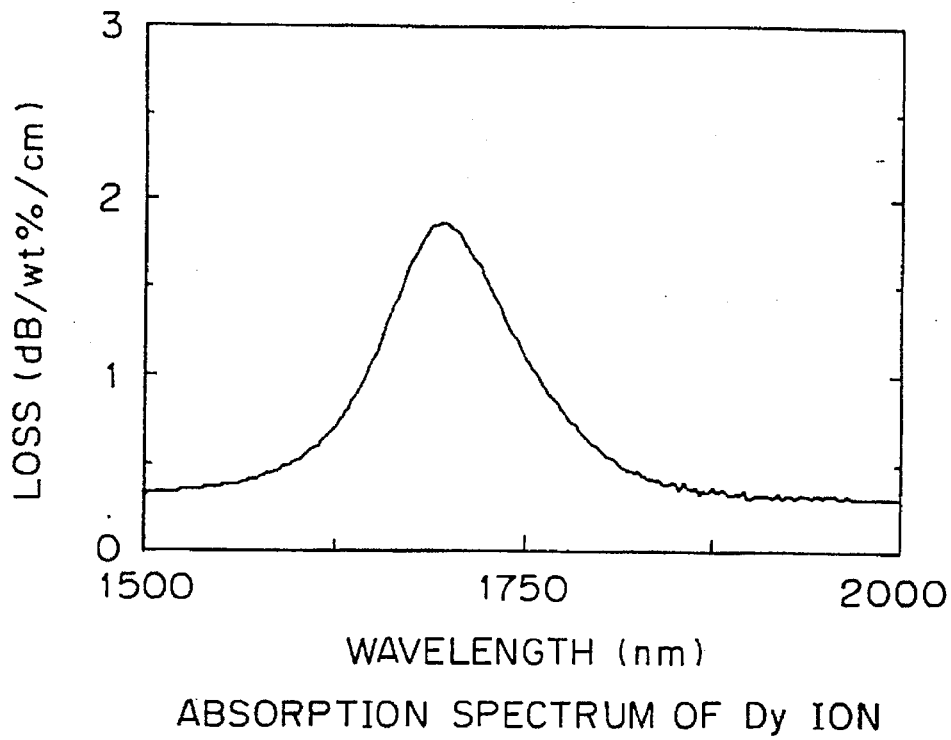
FIG. 10 is a spectrum diagram showing the absorption spectrum of the Dy ion.
Figure 11:
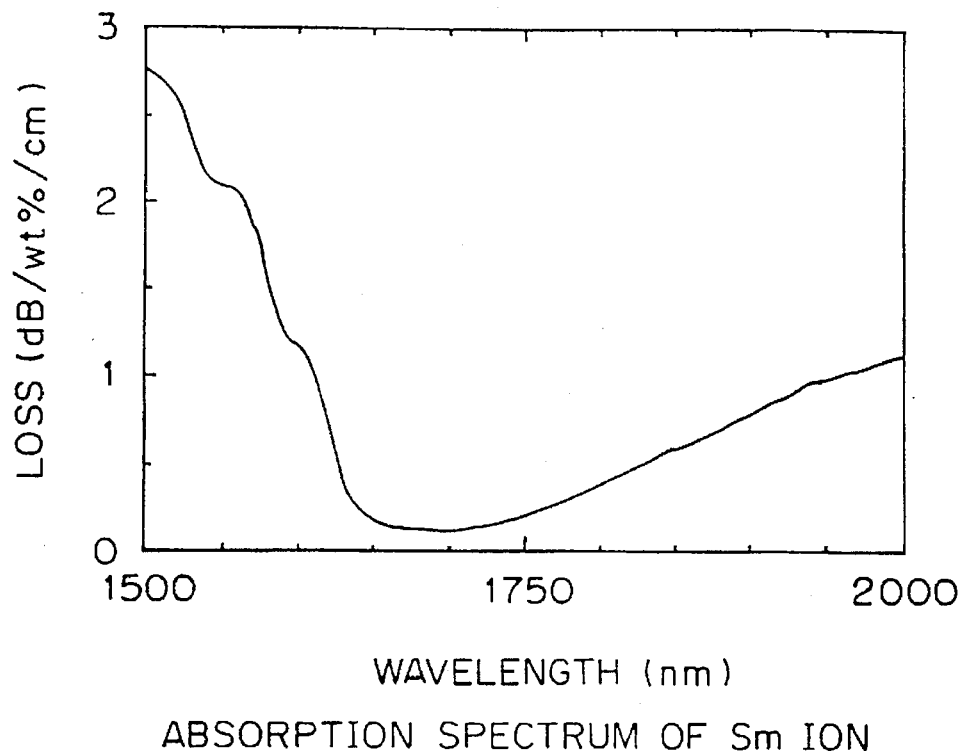
FIG. 11 is a spectrum diagram showing the absorption spectrum of the Sm ion.
Figure 12:
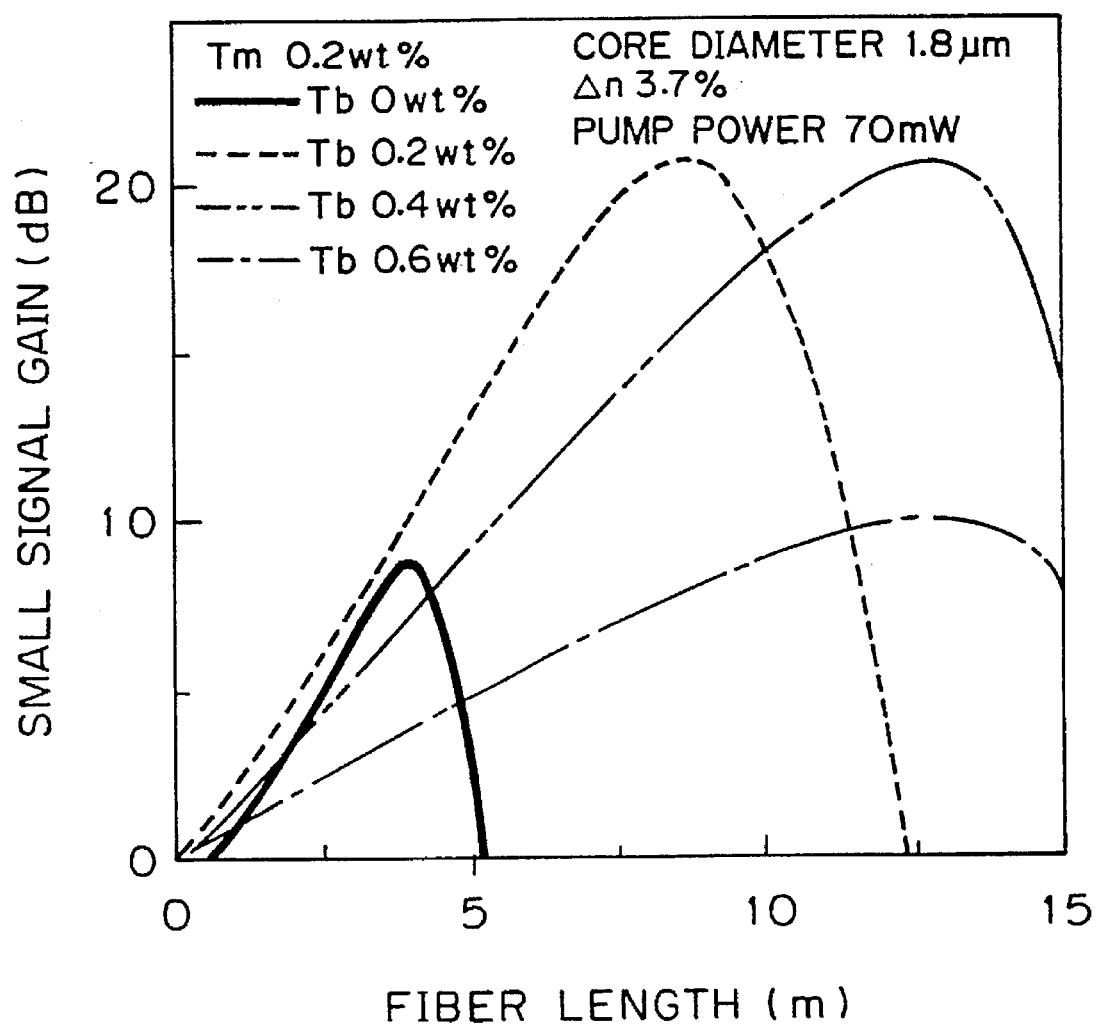
FIG. 12 is a graph showing the dependency of gain to a Tb dose amount in a light amplifying optical fiber according to the present invention.
Figure 13:
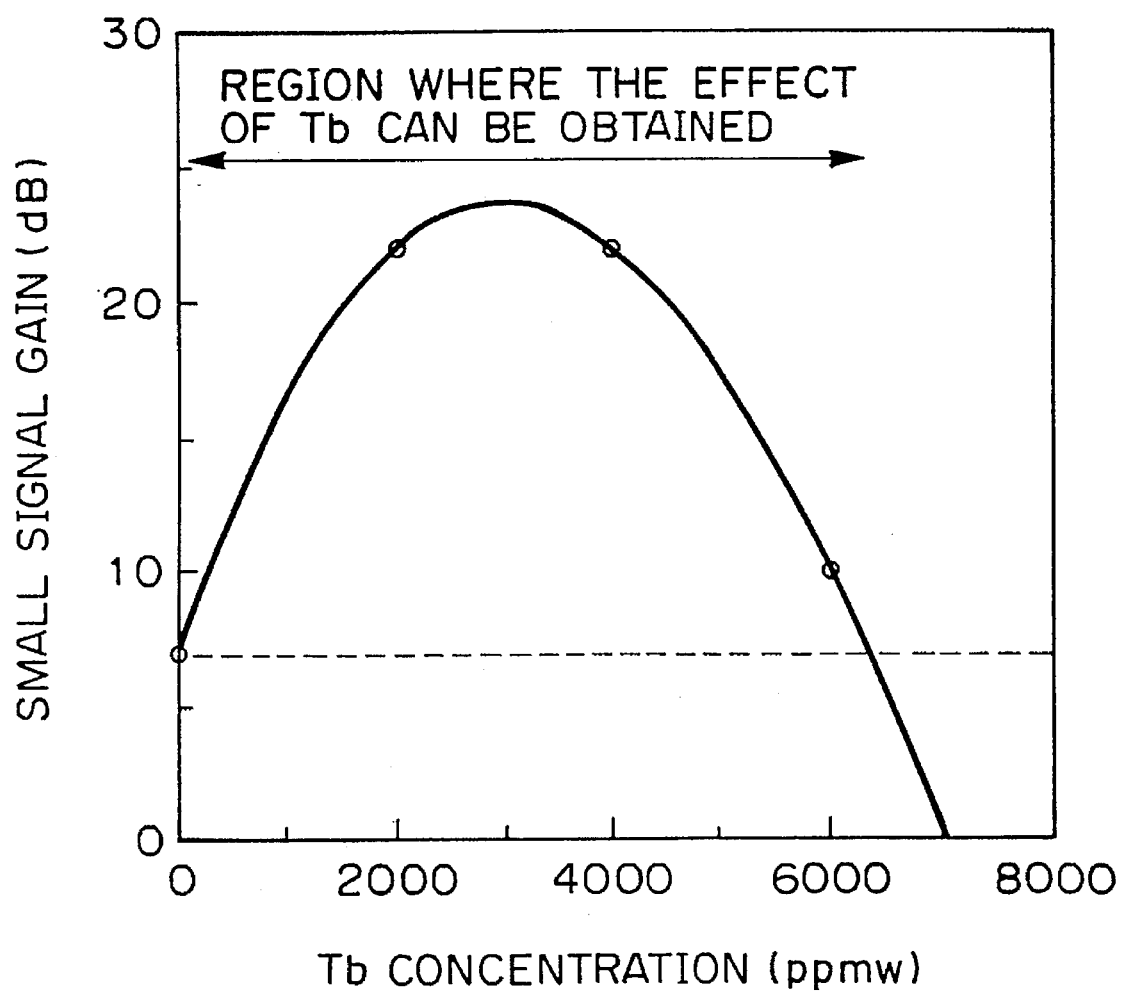
FIG. 13 is a graph showing the dependency of gain to a Tb concentration in a light amplifying optical fiber according to the present invention.
Figure 14:
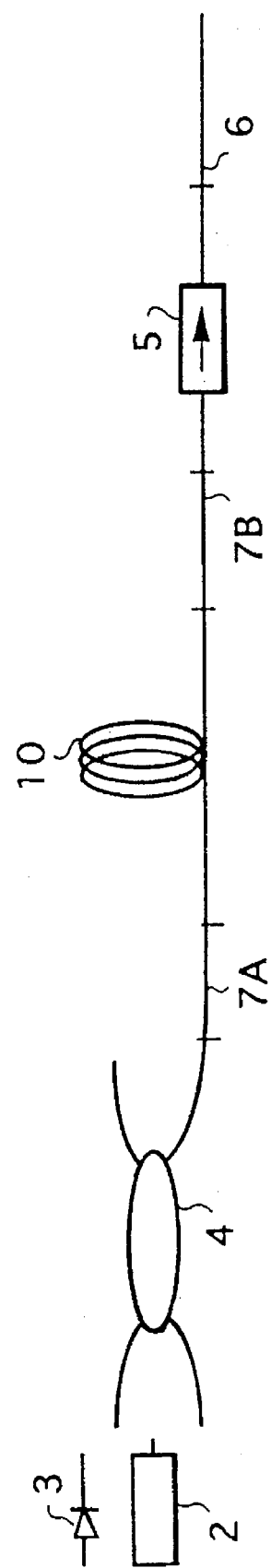
FIG. 14 is a structural diagram of an optical fiber amplifier using a fluoride glass fiber.

FIG. 14 shows the structure of an optical fiber amplifier using a fluoride glass fiber. The optical fiber amplifier includes an optical fiber 10 composed of the above-mentioned fluoride glass fiber, a signal inputting optical fiber 2, a pump light source 3, a wavelength division multiplexing (WDM) fiber coupler 4 which can combine the pump light supplied from the pump light source and a signal light of 1.65 μm, an optical isolator 5, a signal light outputting optical fiber 6, and silica fiber 7A and 7B having high Δn to allow the fluoride glass fiber and the silica fiber to be coupled in a good state. In this case, the pump light source can be used with three types of laser, i.e., a 0.8 μm band high output laser (a semiconductor LD module), a 1.2 μm band high output laser (a semiconductor LD module), or a 1.58 μm band Er fiber laser.

The signal light inputting optical fiber 2 and the semiconductor LD module (pump light source) 3 were coupled to the WDM fiber coupler 4 so that the signal light and the pump light could be combined. One end of the high Δn silica fiber 7A in which the core diameter was expanded using a micro-burner to reduce light loss at the junction portion was coupled to a port of the WDM fiber coupler 4 for taking out the combined light. A glass V-grooved block was attached to the other end of the high Δn silica fiber 7A and was coupled by UV adhesive to another V-grooved block to which one end of the fluoride glass fiber 10 which attached after they were aligned with high precision. The core diameter was also expanded at the other end of the high Δn silica fiber 7B in the manner described above and coupled to one end of the light isolator 5. The signal outputting optical fiber 6 was coupled to the other end of the light isolator 5.

Figure 15:
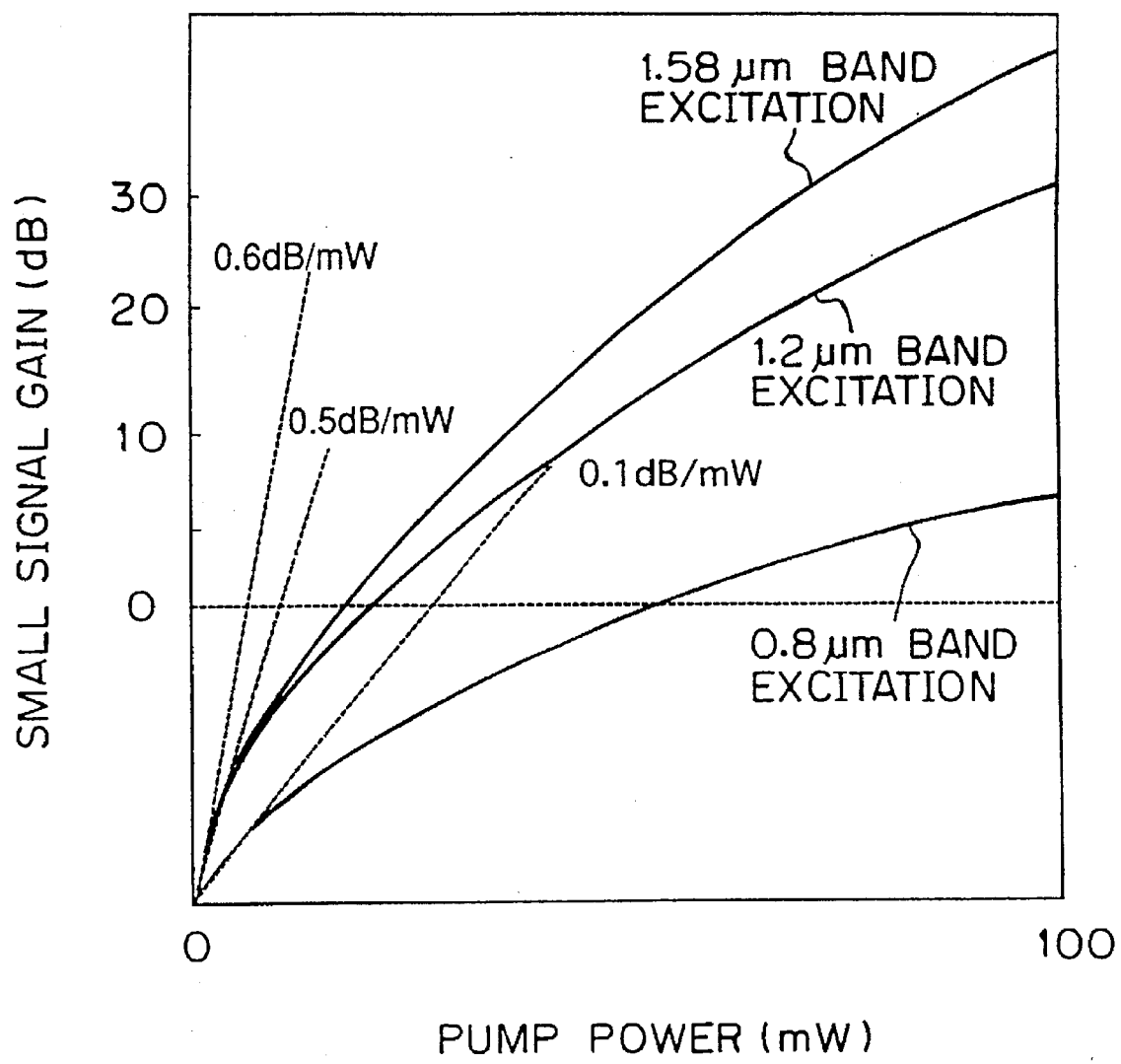
FIG. 15 is a characteristic diagram showing the small signal amplification characteristic of an optical fiber amplifier using a Tm doped fluoride glass fiber in which Tb is doped in the clad.

FIG. 15 shows the small signal gain characteristic of the amplifier when the pump light source was the 0.8 μm band LD, 1.2 μm band LD, and 1.58 μm band fiber laser. A signal gain of 6 dB was obtained when the pump light intensity was 100 mW in the case of the pump light source of 0.8 μm band LD. The gain coefficient was 0.1 dB/mW. A signal gain of 30 dB was obtained when the pump light intensity was 100 mW in a case of the pump light source of 1.2 μm band LD. The gain coefficient was 0.5 dB/mW. A signal gain of 36 dB was obtained when the pump light intensity was 100 mW in a case of the pump light source of a 1.58 μm band fiber laser. The gain coefficient was 0.6 dB/mW.

EMBODIMENT 2

In embodiment 2 a fluoride glass fiber was used in which Tm of 2000 ppm was doped in the core and Eu of 10,000 ppm was doped in the clad. Although Eu represents the absorption characteristic in a range of 1.8 μm to 2.0 μm, the absorption is small in the 1.8 μm band in which ASE is readily caused. For this reason, it is necessary to dope a large amount of Eu in the clad for high efficiency amplification. Because Eu does not represent absorption in the 1.65 μm band, it is possible to make an amplifier of low noise.

The material ratio of the optical fiber, structural parameter and the structure of the optical fiber amplifier were the same as in the embodiment 1.

The small signal gain characteristic of the amplifier represented the same tendency as in embodiment 1 when the pump light source was the 0.8 μm band LD, 1.2 μm band LD, and 1.58 μm band fiber laser. A signal gain of 5 dB was obtained when the pump light intensity was 100 mW in a case of the pump light source of 0.8 μm band LD. The gain coefficient was 0.08 dB/mW. A signal gain of 28 dB was obtained when the pump light intensity was 100 mW in a case of the pump light source of 1.2 μm band LD. The gain coefficient was 0.5 dB/mW. A signal gain of 30 dB was obtained when the pump light intensity was 100 mW in a case of the pump light source of a 1.58 μm band fiber laser. The gain coefficient was 0.5 dB/mW.

EMBODIMENT 3

In the embodiment 3 was used a fluoride glass fiber in which Tm of 2000 ppm was doped in the core and Ho of 5000 ppm was doped in the clad. Although Ho represents the absorption characteristic in a range of 1.8 μm to 2.0 μm, it does not almost represent absorption at 1.65 μm. For this reason, it is possible to make an amplifier of low noise. However, when light of the 1.2 μm band is used as the pump light, high gain cannot be expected because Ho represents absorption at the 1.2 μm band.

The material ratio of the optical fiber, structural parameter and the structure of the optical fiber amplifier were the same as in the embodiment 1.

The small signal gain characteristic of the amplifier represented the same tendency as in the embodiment 1 when the pump light source was the 0.8 μm band LD, 1.2 μm band LD, and 1.58 μm band fiber laser. The signal gain of 5 dB was obtained when the pump light intensity was 100 mW in a case of the pump light source of 0.8 μm band LD. The gain coefficient was 0.08 dB/mW. The signal gain could not be obtained when the pump light intensity was 100 mW in a case of the pump light source of 1.2 μm band LD. The signal gain of 30 dB was obtained when the pump light intensity was 100 mW in a case of the pump light source of a 1.58 μm band fiber laser. The gain coefficient was 0.7 dB/mW.

EMBODIMENT 4

In the embodiment 4 was used a fluoride glass fiber in which Tm of 2000 ppm was doped in the core and Dy of 3000 ppm was doped in the clad. Dy is advantageous in that because Dy represents the absorption characteristic in a range of 1.55 μm to 1.85 μm, the growth of ASE is suppressed absorption in the range so that laser oscillation is prevented. However, Dy has drawbacks in that because the absorption is small on the wavelength side longer than 1.85

µm, the growth of ASE and generation of the laser oscillation were made on the side of a wavelength longer than 1.85 µm and that because Dy represents absorption in the 1.65 µm band, the loss of signal light is great.

The material ratio of the optical fiber, structural parameter and the structure of the optical fiber amplifier were same as in the embodiment 1.

The small signal gain characteristic of the amplifier represented the same tendency as in the embodiment 1 when the pump light source was the 0.8 µm band LD, 1.2 µm band LD, and 1.58 µm band fiber laser. The signal gain of 3 dB was obtained when the pump light intensity was 100 mW in a case of the pump light source of 0.8 µm band LD. The gain coefficient was 0.05 dB/mW. The signal gain of 12 dB was obtained when the pump light intensity was 100 mW in a case of the pump light source of 1.2 µm band LD. The gain coefficient was 0.2 dB/mW. The signal gain of 16 dB was obtained when the pump light intensity was 100 mW in a case of the pump light source of a 1.58 µm band fiber laser. The gain coefficient was 0.25 dB/mW.

EMBODIMENT 5

In the embodiment 5 was used a fluoride glass fiber in which Tm of 2000 ppm was doped in the core and Sm of 3000 ppm was doped in the clad. Sm is advantageous in that because Sm represents the absorption characteristic in the ranges of 1.55 µm to 1.65 µm and 1.7 µm to 2.0 µm, the growth of ASE is suppressed absorption in the range so that laser oscillation is prevented. However, Sm has a drawback in that because Sm represents somewhat absorption in the 1.65 µm band, the loss of signal light is great.

The material ratio of the optical fiber, structural parameter and the structure of the optical fiber amplifier were the same as in the embodiment 1.

The small signal gain characteristic of the amplifier represented the same tendency as in the embodiment 1 when the pump light source was the 0.8 µm band LD, 1.2 µm band LD, and 1.58 µm band fiber laser. The signal gain of 2 dB was obtained when the pump light intensity was 100 mW in a case of the pump light source of 0.8 µm band LD. The gain coefficient was 0.05 dB/mW. The signal gain of 10 dB was obtained when the pump light intensity was 100 mW in a case of the pump light source of 1.2 µm band LD. The gain coefficient was 0.15 dB/mW. A signal gain of 16 dB was obtained when the pump light intensity was 100 mW in a case of the pump light source of 1.58 µm band fiber laser. The gain coefficient was 0.25 dB/mW.

EMBODIMENT 6

In the embodiment 6 was used a fluoride glass fiber in which Tm of 2000 ppm was doped in the core and Nd of 3000 ppm was doped in the clad. Nd is advantageous in that because Nd represents the absorption characteristic in a range of 1.6 µm to 1.85 µm, the growth of ASE is suppressed absorption in the range so that laser oscillation is prevented. However, Nd has drawbacks in that because the absorption is small on the wavelength side longer than 1.85 µm, the growth of ASE and generation of the laser oscillation are made on the side of a wavelength longer than 1.85 µm and that because Nd represents absorption in the 1.65 µm band, the loss of signal light is great.

The material ratio of the optical fiber, structural parameter and the structure of the optical fiber amplifier were the same as in the embodiment 1.

The small signal gain characteristic of the amplifier represented the same tendency as in the embodiment 1 when the pump light source was the 0.8 µm band LD, 1.2 µm band LD, and 1.58 µm band fiber laser. The signal gain of 2 dB was obtained when the pump light intensity was 100 mW in a case of the pump light source of 0.8 µm band LD. The gain coefficient was 0.04 dB/mW. The signal gain of 10 dB was obtained when the pump light intensity was 100 mW in a case of the pump light source of 1.2 µm band LD. The gain coefficient was 0.15 dB/mW. A signal gain of 12 dB was obtained when the pump light intensity was 100 mW in a case of the pump light source of 1.58 µm band fiber laser. The gain coefficient was 0.2 dB/mW.

Comparison 1

In a COMPARISON 1 is shown the case that Tm of 2000 ppm is doped in the core. The composition of an optical fiber, a specific refraction index difference $\Delta n$, the core diameter, and the structure of the optical fiber amplifier were the same as in the embodiment 1. The optimal lengths of the fiber when high gains can be obtained for the respective pump light sources are shorter, compared to the case of embodiment 1. In this embodiment the length of the fiber was 2 m.

Figure 16:
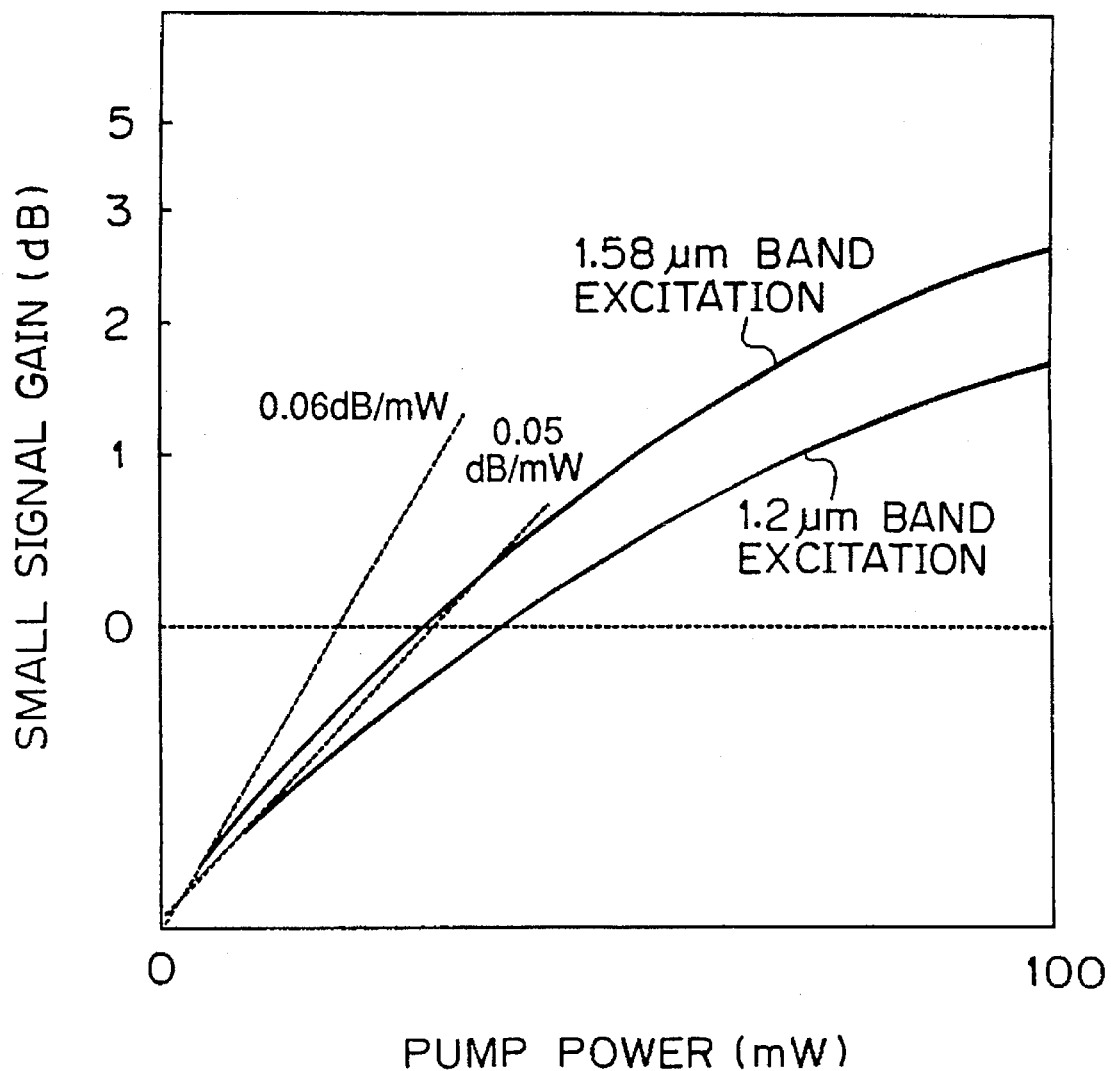
FIG. 16 is a characteristic diagram showing the small signal amplification characteristic of a Tm only doped fluoride glass fiber amplifier.

FIG. 16 shows the small signal gain characteristics. The 0.8 µm band LD, 1.2 µm band LD, and 1.58 µm band fiber laser were used as the pump light sources. No gain was obtained when the pump light intensity was 100 mW in a case of the pump light source of 0.8 µm band LD. A signal gain of 3 dB was obtained when the pump light intensity was 100 mW in a case of the pump light source of a 1.2 µm band LD. The gain coefficient was 0.05 dB/mW. The signal gain of 4 dB was obtained when the pump light intensity was 100 mW in a case of the pump light source of a 1.58 µm band fiber laser. The gain coefficient was 0.06 dB/mW.

The amplified spontaneous emission lights were about 50 mW and 75 mW in a case of 100 mW excitation using the pump light of wavelengths of 1.2 µm band and 1.58 µm band, respectively. Accordingly, it could be understood that more than a half of the energy of the pump light was spent for the spontaneous emission light.

From the comparison 1 can be seen the effect when ions of Tb, Eu, Ho, Dy, Sm or Nd are doped in the clad.

EMBODIMENT 7

In the embodiment 7, a silica fiber was used in which Tm of 1000 ppm was doped in the core and Tb of 1000 ppm was doped in the clad. The glass composition of the core was $SiO_2$ of 80 mol % and $GeO_2$ of 20 mol % and that of the clad was $SiO_2$ of 100 mol %. A specific refraction index difference was 2.0%. The core diameter was 3.0 µm and the length of the fiber was 40 m. In this fiber, about 50% of the light of 1.65 µm band is confined in the core and the remained portion soaks out to the clad. About 40% of the light of the 1.8 µm band is confined in the core and the remaining portion soaks out to the clad.

Figure 17:
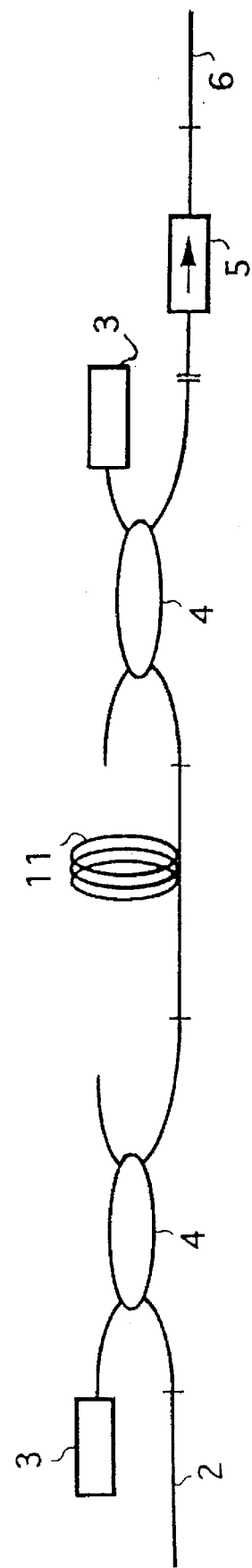
FIG. 17 is a structural diagram of an optical fiber amplifier using a silica fiber.

FIG. 17 shows the structure of an optical fiber amplifier. The optical fiber amplifier includes an optical fiber 11 composed of the above-mentioned silica fiber and a signal inputting optical fiber 2. Two high output Er doped fiber lasers of 1.58 µm were used as a pump light source 3. The pump light of 1.58 µm supplied from the Er-doped fiber lasers 3 and a signal light in the 1.65 µm band were combined and separated by a fiber coupler 4 which included a filter. The signal light inputting fiber 2 was coupled to a signal light inputting port of the WDM fiber coupler. The light from the Er-doped fiber lasers 3 was guided from both ends of the silica fiber 11 via the fiber couplers 4. An output fiber 6 was coupled to the fiber coupler end on the output side via a light isolator 5.

Figure 18:
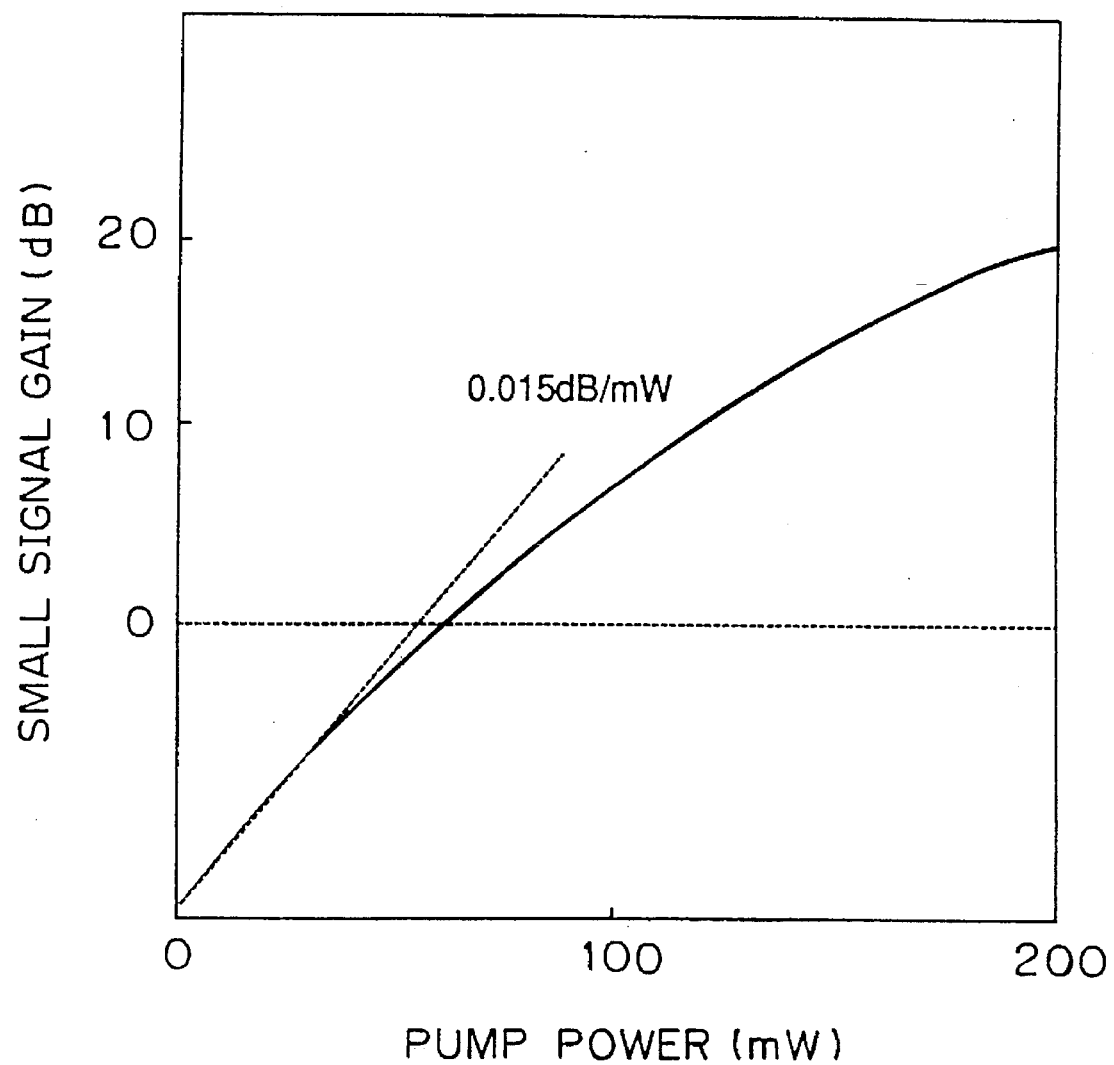
FIG. 18 is a characteristic diagram showing the small signal amplification characteristic of an optical fiber amplifier using a Tm doped silica fiber in which Tb is doped in the clad.

FIG. 18 shows the small signal gain characteristics of the amplifier. A signal gain of 20 dB was obtained when the pump light intensity was 200 mW. The gain coefficient was 0.015 dB/mW.

11

EMBODIMENT 8

In embodiment 8 a silica fiber was used in which Tm of 1000 ppm was doped in the core and Eu of 3000 ppm was doped in the clad.

The composition of the used optical fiber, the structural parameter of the optical fiber and the structure of the optical fiber amplifier were the same as in the embodiment 7.

The gain of 16 dB was obtained when the pump light of 200 mW was used. The gain coefficient was 0.12 dB/mW.

EMBODIMENT 9

In embodiment 9 a silica fiber was used in which Tm of 1000 ppm was doped in the core and Ho of 2000 ppm was doped in the clad. The composition of the used optical fiber, the structural parameter of the optical fiber and the structure of the optical fiber amplifier were the same as in the embodiment 7.

The gain of 15 dB was obtained when the pump light of 200 mW was used. The gain coefficient was 0.12 dB/mW.

EMBODIMENT 10

In embodiment 10 a silica fiber was used in which Tm of 1000 ppm was doped in the core and Dy of 2000 ppm was doped in the clad.

The composition of the used optical fiber, the structural parameter of the optical fiber and the structure of the optical fiber amplifier were the same as in the embodiment 7.

The gain of 3 dB was obtained when the pump light of 200 mW was used. The gain coefficient was 0.025 dB/mW.

EMBODIMENT 11

In embodiment 11 a silica fiber was used in which Tm of 1000 ppm was doped in the core and Sm of 2000 ppm was doped in the clad.

The composition of the used optical fiber, the structural parameter of the optical fiber and the structure of the optical fiber amplifier were the same as in the embodiment 7.

The gain of 3 dB was obtained when the pump light of 200 mW was used. The gain coefficient was 0.03 dB/mW.

EMBODIMENT 12

In embodiment 12 a silica fiber was used in which Tm of 1000 ppm was doped in the core and Nd of 2000 ppm was doped in the clad.

The composition of the used optical fiber, the structural parameter of the optical fiber and the structure of the optical fiber amplifier were the same as in the embodiment 7.

The gain of 2 dB was obtained when the pump light of 200 mW was used. The gain coefficient was 0.035 dB/mW.

Comparison 2

Only Tm was doped by 1000 ppm to the optical fiber having the same structural parameter as in the embodiment 7 to produce an optical amplifier having the same structure as that of the embodiment 7.

Although the length of the optical fiber was 8 m with which ASE light was the strongest, no gain could be obtained.

From this result, it was verified that it was significant to dope absorbent ions in the clad.

EMBODIMENT 13

In the embodiment 13, an aluminium multi-component glass fiber was used in which Tm of 3000 ppm was doped in the core and Tb of 3000 ppm was doped in the clad. The glass composition of the core was $Al_2O_3$ of 41 mol %, $GeO_2$ of 6 mol %, MgO of 5 mol %, and CaO of 48 mol %. The glass composition of the clad was $Al_2O_3$ of 41 mol %, $SiO_2$ of 6 mol %, MgO of 5 mol %, and CaO of 48 mol %.

The specific refraction index difference was about 0.5%. The core diameter was 5.0 μm and the length of the fiber was 6 m. The structure of the optical fiber amplifier was the same as in the embodiment 7.

12

A signal gain of 10dB was obtained when a pump light of 200 mW was used. The gain coefficient was 0.075 dB/mW. Taking into account that the loss of the fiber was 2 dB/mW (when measured with light of 1.3 μm band) and was large, it can be expected that a high efficiency fiber amplifier can be realized using the fiber by making the loss small through dehydration and purification of the material.

EMBODIMENT 14

In embodiment 14 an aluminium multi-component glass fiber was used in which Tm of 3000 ppm was doped in the core and Eu of 3000 ppm was doped in the clad.

The composition of the used optical fiber, the structural parameter of the optistructure of thee structure of the optical fiber amplifier were the same as in the embodiment 13.

The gain of 8dB was obtained when the pump light of 200 mW was used. The gain coefficient was 0.06 dB/mW.

EMBODIMENT 15

In embodiment 15 an aluminium multi-component glass fiber was used in which Tm of 3000 ppm was doped in the core and Ho of 3000 ppm was doped in the clad.

The composition of the used optical fiber, the structural parameter of the optical fiber and the structure of the optical fiber amplifier were the same as in the embodiment 13.

The gain of 7 dB was obtained when the pump light of 200 mW was used. The gain coefficient was 0.5 dB/mW.

EMBODIMENT 16

In embodiment 16 an aluminium multi-component glass fiber was used in which Tm of 3000 ppm was doped in the core and Sm of 3000 ppm was doped in the clad.

The composition of the used optical fiber, the structural parameter of the optical fiber and the structure of the optical fiber amplifier were the same as in the embodiment 13.

The gain of 3 dB was obtained when the pump light of 200 mW was used. The gain coefficient was 0.02 dB/mW.

EMBODIMENT 17

In embodiment 17 an aluminium multi-component glass fiber in which Tm of 3000 ppm was doped in the core and Dy of 3000 ppm was doped in the clad.

The composition of the used optical fiber, the structural parameter of the optical fiber and the structure of the optical fiber amplifier were the same as in the embodiment 13.

The gain of 2 dB was obtained when the pump light of 200 mW was used. The gain coefficient was 0.015 dB/mW.

EMBODIMENT 18

In embodiment 18 an aluminium multi-component glass fiber in which Tm of 3000 ppm was doped in the core and Nd of 3000 ppm was doped in the clad.

The composition of the used optical fiber, the structural parameter of the optical fiber and the structure of the optical fiber amplifier were the same as in the embodiment 13.

The gain of 1 dB was obtained when the pump light of 200 mW was used. The gain coefficient was 0.075 dB/mW.

EMBODIMENT 19

In the embodiment 19, a Te glass fiber was used in which Tm of 2000 ppm was doped in the core and Tb of 2000 ppm was doped in the clad. The glass composition of the core was $TeO_2$ of 70 mol %, ZnO of 15 mol %, and PbO of 15 mol %. The glass composition of the clad was $TeO_2$ of 70 mol %, ZnO of 20 mol %, and CdO of 10 mol %. In this case, the specific refraction index difference was 1%.

The core diameter was 4.0 μm and the length of the fiber was 6 m.

The gain of 30 dB was obtained when the pump light of 200 mW was used. The gain coefficient was 0.22 dB/mW.

EMBODIMENT 20

In the embodiment 2, a Te glass fiber was used in which Tm of 2000 ppm was doped in the core and Ho of 2000 ppm was doped in the clad.

The composition of the used optical fiber, the structural parameter of the optical fiber and the structure of the optical fiber amplifier were the same as in the embodiment 19.

The gain of 22 dB was obtained when the pump light of 200 mW was used. The gain coefficient was 0.16 dB/mW.

EMBODIMENT 21

In the embodiment 21, a Te glass fiber was used in which Tm of 2000 ppm was doped in the core and Eu of 2000 ppm was doped in the clad.

The composition of the used optical fiber, the structural parameter of the optical fiber and the structure of the optical fiber amplifier were the same as in the embodiment 19.

The gain of 26 dB was obtained when the pump light of 200 mW was used. The gain coefficient was 0.2 dB/mW.

EMBODIMENT 22

In the embodiment 22, a Te glass fiber was used in which Tm of 2000 ppm was doped in the core and Nd of 2000 ppm was doped in the clad.

The composition of the used optical fiber, the structural parameter of the optical fiber and the structure of the optical fiber amplifier were the same as in the embodiment 19.

The gain of 8 dB was obtained when the pump light of 200 mW was used. The gain coefficient was 0.06 dB/mW.

EMBODIMENT 23

In the embodiment 23, a Te glass fiber was used in which Tm of 2000 ppm was doped in the core and Sm of 2000 ppm was doped in the clad.

The composition of the used optical fiber, the structural parameter of the optical fiber and the structure of the optical fiber amplifier were the same as in the embodiment 19.

The gain of 6 dB was obtained when the pump light of 200 mW was used. The gain coefficient was 0.05 dB/mW.

EMBODIMENT 24

In the embodiment 24, a Te glass fiber was used in which Tm of 2000 ppm was doped in the core and Dy of 2000 ppm was doped in the clad.

The composition of the used optical fiber, the structural parameter of the optical fiber and the structure of the optical fiber amplifier were the same as in the embodiment 13.

The gain of 4 dB was obtained when the pump light of 200 mW was used. The gain coefficient was 0.03 dB/mW.

EMBODIMENT 25

In embodiment 25 a fluoride glass fiber was used in which Tm of 2000 ppm was doped in the core and Tb of 2000 ppm was doped in the clad.

The material ratio of the optical fiber, the structural parameter and the structure of the optical fiber amplifier were the same as in the embodiment 1.

The small signal gain characteristics of the amplifier were as follows when the pump light source was the 0.8 μm band LD, 1.2 μm band LD, and 1.58 μm band fiber laser. A signal gain of 4 dB was obtained when the pump light intensity was 100 mW in the case of a pump light source of 0.8 μm band LD. The gain coefficient was 0.06 dB/mW. A signal gain of 25 dB was obtained when the pump light intensity was 100 mW in the case of a pump light source of 1.2 μm band LD. A gain coefficient was 0.375 dB/mW. The signal gain of 30 dB was obtained when the pump light intensity was 100 mW in the case of a pump light source of 1.58 μm band fiber laser. The gain coefficient was 0.45 dB/mW.

EMBODIMENT 26

In embodiment 26 a fluoride glass fiber was used in which Tm of 2000 ppm was doped in the core and Eu of 2000 ppm was doped in the clad.

The material ratio of the optical fiber, the structural parameter and the structure of the optical fiber amplifier were the same as in the embodiment 1.

The small signal gain characteristics of the amplifier showed the same tendency as in the embodiment 25 when the pump light source was the 0.8 μm band LD, 1.2 μm band LD, and 1.58 μm band fiber laser. The signal gain of 3 dB was obtained when the pump light intensity was 100 mW in a case of the pump light source of 0.8 μm band LD. The gain coefficient was 0.05 dB/mW. The signal gain of 22 dB was obtained when the pump light intensity was 100 mW in a case of the pump light source of 1.2 μm band LD. The gain coefficient was 0.33 dB/mW. The signal gain of 27 dB was obtained when the pump light intensity was 100 mW in a case of the pump light source of 1.58 μm band fiber laser. The gain coefficient was 0.40 dB/mW.

EMBODIMENT 27

In the embodiment 26 was used a fluoride glass fiber in which Tm of 2000 ppm was doped in the core and Ho of 2000 ppm was doped in the clad.

The material ratio of the optical fiber, the structural parameter and the structure of the optical fiber amplifier were the same as in the embodiment 1.

The small signal gain characteristics of the amplifier showed the same tendency as in the embodiment 25 when the pump light source was the 0.8 μm band LD, 1.2 μm band LD, and 1.58 μm band fiber laser. The signal gain of 5 dB was obtained when the pump light intensity was 100 mW in a case of the pump light source of 0.8 μm band LD. The gain coefficient was 0.075 dB/mW. No gain was obtained when the pump light source of 1.2 μm band LD was used. The signal gain of 27 dB was obtained when the pump light intensity was 100 mW in a case of the pump light source of 1.58 μm band fiber laser. The gain coefficient was 0.40 dB/mW.

EMBODIMENT 28

In embodiment 28 a fluoride glass fiber was used in which Tm of 2000 ppm was doped in the core and Dy of 2000 ppm was doped in the clad.

The material ratio of the optical fiber, the structural parameter and the structure of the optical fiber amplifier were the same as in the embodiment 1.

The small signal gain characteristics of the amplifier showed the same tendency as in the embodiment 25 when the pump light source was the 0.8 μm band LD, 1.2 μm band LD, and 1.58 μm band fiber laser. No gain was obtained when the pump light intensity was 100 mW in a case of the pump light source of 0.8 μm band LD. The signal gain of 25 dB was obtained when the pump light intensity was 100 mW in a case of the pump light source of 1.2 μm band LD. The gain coefficient was 0.4 dB/mW. The signal gain of 28 dB was obtained when the pump light intensity was 100 mW in a case of the pump light source of 1.58 μm band fiber laser. The gain coefficient was 0.42 dB/mW.

EMBODIMENT 29

In embodiment 29 a fluoride glass fiber was used in which Tm of 2000 ppm was doped in the core and Nd of 2000 ppm was doped in the clad.

The material ratio of the optical fiber, the structural parameter and the structure of the optical fiber amplifier were the same as in the embodiment 1.

The small signal gain characteristics of the amplifier showed the same tendency as in the embodiment 25 when the pump light source was the 0.8 μm band LD, 1.2 μm band LD, and 1.58 μm band fiber laser. The signal gain of 2 dB was obtained when the pump light intensity was 100 mW in a case of the pump light source of 0.8 μm band LD. The gain coefficient was 0.03 dB/mW. The signal gain of 9 dB was obtained when the pump light intensity was 100 mW in a case of the pump light source of 1.2 μm band LD. The gain coefficient was 0.12 dB/mW. The signal gain of 12 dB was obtained when the pump light intensity was 100 mW in a case of the pump light source of 1.58 µm band fiber laser. The gain coefficient was 0.18 dB/mW.

EMBODIMENT 30

In embodiment 30 a fluoride glass fiber was used in which Tm of 2000 ppm was doped in the core and Sm of 2000 ppm was doped in the clad.

The material ratio of the optical fiber, the structural parameter and the structure of the optical fiber amplifier were the same as in the embodiment 1.

The small signal gain characteristics of the amplifier showed the same tendency as in the embodiment 25 when the pump light source was the 0.8 µm band LD, 1.2 µm band LD, and 1.58 µm band fiber laser. No gain was obtained when the pump light source of 0.8 µm band LD was used. The signal gain of 4 dB was obtained when the pump light intensity was 100 mW in a case of the pump light source of 1.2 µm band LD. The gain coefficient was 0.06 dB/mW. The signal gain of 6 dB was obtained when the pump light intensity was 100 mW in a case of the pump light source of 1.58 µm band fiber laser. The gain coefficient was 0.09 dB/mW.

EMBODIMENT 31

In embodiment 31 a silica fiber was used in which Tm of 1000 ppm and Tb of 2000 ppm were co-doped in the core.

The glass composition of the used optical fiber, the structural parameter of the optical fiber, and the structure of the optical fiber amplifier were the same as in the embodiment 7.

The gain of 12 dB was obtained when the pump light of 200 mW was used. The gain coefficient was 0.1 dB/mW.

EMBODIMENT 32

In embodiment 32 a silica fiber was used in which Tm of 1000 ppm and Eu of 2000 ppm were co-doped in the core.

The glass composition of the used optical fiber, the structural parameter of the optical fiber, and the structure of the optical fiber amplifier were the same as in the embodiment 7.

The gain of 8 dB was obtained when the pump light of 200 mW was used. The gain coefficient was 0.06 dB/mW.

EMBODIMENT 33

In embodiment 33 a silica filter was used in which Tm of 1000 ppm and Ho of 2000 ppm were co-doped in the core.

The glass composition of the used optical fiber, the structural parameter of the optical fiber, and the structure of the optical fiber amplifier were the same as in the embodiment 7.

The gain of 7 dB was obtained when the pump light of 200 mW was used. The gain coefficient was 0.05 dB/mW.

EMBODIMENT 34

In embodiment 34 a silica fiber was used in which Tm of 1000 ppm and Nd of 2000 ppm were co-doped in the core.

The glass composition of the used optical fiber, the structural parameter of the optical fiber, and the structure of the optical fiber amplifier were the same as in the embodiment 7.

The gain of 4 dB was obtained when the pump light of 200 mW was used. The gain coefficient was 0.03 dB/mW.

EMBODIMENT 35

In embodiment 35 a silica fiber was used in which Tm of 1000 ppm and Sm of 2000 ppm were co-doped in the core.

The glass composition of the used optical fiber, the structural parameter of the optical fiber, and the structure of the optical fiber amplifier were the same as in the embodiment 7.

The gain of 1 dB was obtained when the pump light of 200 mW was used. The gain coefficient was 0.007 dB/mW.

EMBODIMENT 36

In embodiment 36 a silica fiber was used in which Tm of 1000 ppm and Dy of 2000 ppm were co-doped in the core.

The glass composition of the used optical fiber, the structural parameter of the optical fiber, and the structure of the optical fiber amplifier were the same as in the embodiment 7.

The gain of 5 dB was obtained when the pump light of 200 mW was used. The gain coefficient was 0.04 dB/mW.

EMBODIMENT 37

In embodiment 37 an aluminium multi-component glass fiber was used in which Tm of 3000 ppm and Tb of 3000 ppm were co-doped in the core.

The glass composition of the used optical fiber, the structural parameter of the optical fiber, and the structure of the optical fiber amplifier were the same as in the embodiment 13.

The gain of 17 dB was obtained when the pump light of 200 mW was used. The gain coefficient was 0.25 dB/mW.

EMBODIMENT 38

In embodiment 38 an aluminium multi-component glass fiber was used in which Tm of 3000 ppm and Eu of 3000 ppm were co- doped in the core.

The glass composition of the used optical fiber, the structural parameter of the optical fiber, and the structure of the optical fiber amplifier were the same as in the embodiment 13.

The gain of 13 dB was obtained when the pump light of 200 mW was used. The gain coefficient was 0.1 dB/mW.

EMBODIMENT 39

In embodiment 39 an aluminium multi-component glass fiber was used in which Tm of 3000 ppm and Ho of 3000 ppm were co-doped in the core.

The glass composition of the used optical fiber, the structural parameter of the optical fiber, and the structure of the optical fiber amplifier were the same as in the embodiment 13.

The gain of 11 dB was obtained when the pump light of 200 mW was used. The gain coefficient was 0.07 dB/mW.

EMBODIMENT 40

In embodiment 40 an aluminium multi-component glass fiber was used in which Tm of 3000 ppm and Nd of 3000 ppm were co- doped in the core.

The glass composition of the used optical fiber, the structural parameter of the optical fiber, and the structure of the optical fiber amplifier were the same as in the embodiment 13.

The gain of 4 dB was obtained when the pump light of 200 mW was used. The gain coefficient was 0.03 dB/mW.

EMBODIMENT 41

In embodiment 41 an aluminium multi-component glass fiber was used in which Tm of 3000 ppm and Dy of 3000 ppm were co-doped in the core.

The glass composition of the used optical fiber, the structural parameter of the optical fiber, and the structure of the optical fiber amplifier were the same as in the embodiment 13.

The gain of 7 dB was obtained when the pump light of 200 mW was used. The gain coefficient was 0.05 dB/mW.

EMBODIMENT 42

In embodiment 42 aluminium multi-component glass fiber was used in which Tm of 3000 ppm and Sm of 3000 ppm were co-doped in the core.

The glass composition of the used optical fiber, the structural parameter of the optical fiber, and the structure of the optical fiber amplifier were the same as in the embodiment 13.

The gain of 1dB was obtained when the pump light of 200 mW was used. The gain coefficient was 0.007 dB/mW.

EMBODIMENT 43

In embodiment 43 a Te glass fiber was used in which Tm of 3000 ppm and Tb of 3000 ppm were co-doped in the core.

The glass composition of the used optical fiber, the structural parameter of the optical fiber, and the structure of the optical fiber amplifier were the same as in the embodiment 19.

The gain of 26 dB was obtained when the pump light of 200 mW was used. The gain coefficient was 0.20 dB/mW.

EMBODIMENT 44

In embodiment 44 a Te glass fiber was used in which Tm of 3000 ppm and Eu of 3000 ppm were co-doped in the core.

The glass composition of the used optical fiber, the structural parameter of the optical fiber, and the structure of the optical fiber amplifier were the same as in the embodiment 19.

The gain of 18 dB was obtained when the pump light of 200 mW was used. The gain coefficient was 0.14 dB/mW.

EMBODIMENT 45

In embodiment 45 a Te Glass fiber was used in which Tm of 3000 ppm and Ho of 3000 ppm were co-doped in the core.

The glass composition of the used optical fiber, the structural parameter of the optical fiber, and the structure of the optical fiber amplifier were the same as in the embodiment 19.

The gain of 22 dB was obtained when the pump light of 200 mW was used. The gain coefficient was 0.17 dB/mW.

EMBODIMENT 46

In embodiment 46 a Te Glass fiber was used in which Tm of 3000 ppm and Nd of 3000 ppm were co-doped in the core.

The glass composition of the used optical fiber, the structural parameter of the optical fiber, and the structure of the optical fiber amplifier were the same as in the embodiment 19.

The gain of 6 dB was obtained when the pump light of 200 mW was used. The gain coefficient was 0.01 dB/mW.

EMBODIMENT 47

In embodiment 47 a Te glass fiber was used in which Tm of 3000 ppm and Dy of 3000 ppm were doped in the core.

The glass composition of the used optical fiber, the structural parameter of the optical fiber, and the structure of the optical fiber amplifier were the same as in the embodiment 19.

The gain of 1 dB was obtained when the pump light of 200 mW was used. The gain coefficient was 0.007 dB/mW.

EMBODIMENT 48

In embodiment 48 a Te glass fiber was used in which Tm of 3000 ppm and Sm of 3000 ppm were co-doped in the core.

The glass composition of the used optical fiber, the structural parameter of the optical fiber, and the structure of the optical fiber amplifier were the same as in the embodiment 19.

The gain of 4 dB was obtained when the pump light of 200 mW was used. The gain coefficient was 0.03 dB/mW.

EMBODIMENT 49

Figure 19:
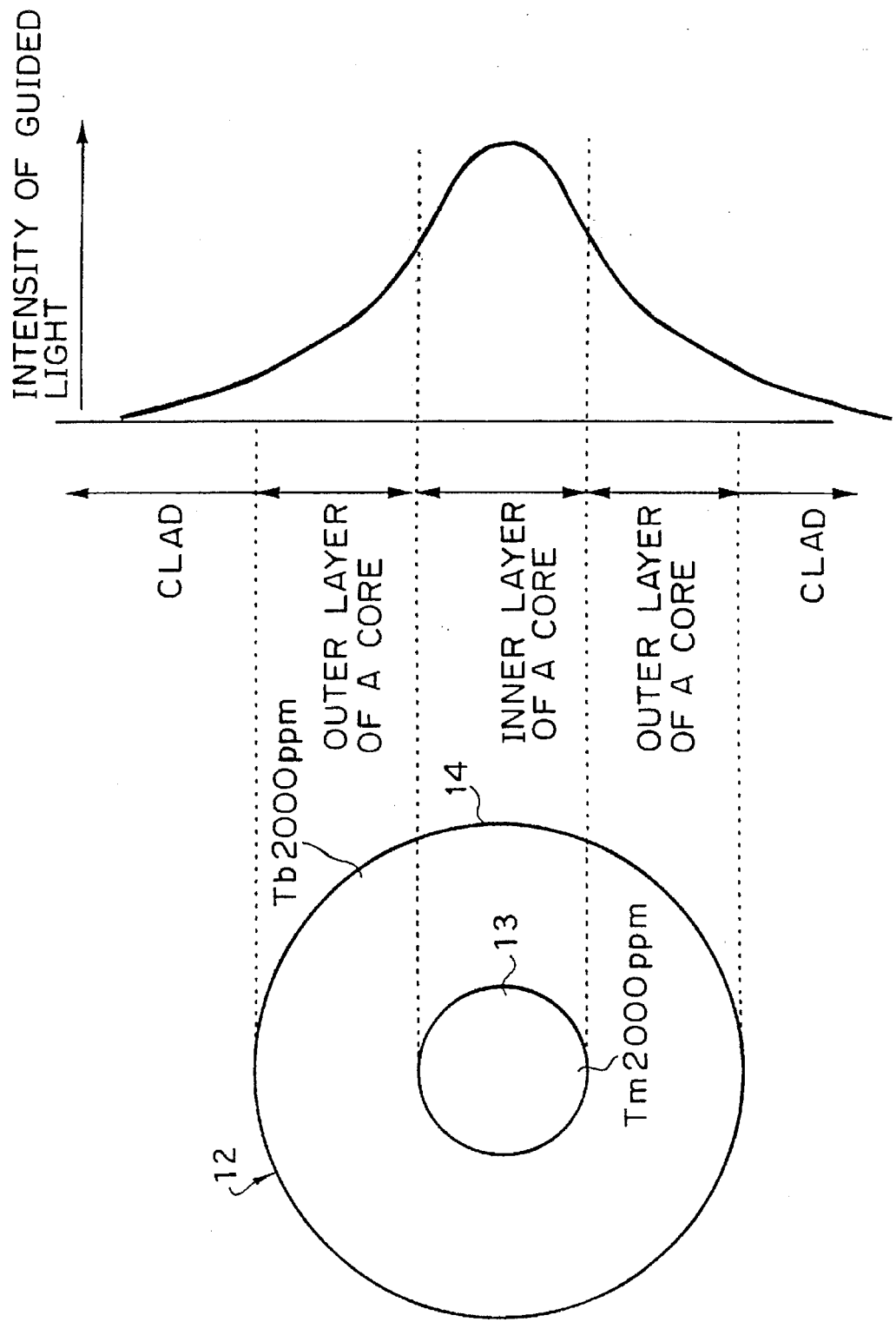
FIG. 19 is a cross sectional view of a fiber in which Tm is doped in the inner layer of two-layer core structure and Tb is doped in the outer layer thereof.

In embodiment 49 a fluoride glass fiber was used which was composed of a two-layer core 12 which was formed by two concentric layers and a clad. As shown in FIG. 19, Tm of 2000 ppm was doped in the inner layer 13 of the two-layer core and Tb of 2000 ppm was doped in the outer layer 14 thereof. No dopant was doped in the clad. The fiber has the following two advantages: (i) the decrease of amplification efficiency due to cross relaxation can be prevented because Tm and Tb are separated. Also, (ii) the light traveling in the core has a distribution of light intensity as shown in FIG. 19. Therefore, because Tm is doped in the inner layer of the core, a portion of guided pump light having strong intensity can be used to excite with a high efficiency.

The glass composition of the optical fiber, the structural parameter of the optical fiber and the structure of the optical fiber amplifier were the same as in the embodiment 1. The ratio of the inner core diameter and the outer core diameter was 1:3 as shown in FIG. 19.

The small signal gain characteristics of the amplifier are as follows when the pump light source was the 0.8 μband LD, 1.2 μm band LD, and 1.58 μm band fiber laser. The signal gain of 5 dB was obtained when the pump light intensity was 100 mW in a case of the pump light source of 0.8 μm band LD. The gain coefficient was 0.07 dB/mW. The signal gain of 26 dB was obtained when the pump light intensity was 100 mW in a case of the pump light source of 1.2 μm band LD. The gain coefficient was 0.4 dB/mW. The signal gain of 28 dB was obtained when the pump light intensity was 100 mW in a case of the pump light source of 1.58 μm band fiber laser. The gain coefficient was 0.40 dB/mW.

EMBODIMENT 50

In embodiment 50 a fluoride glass fiber was used composed of a two-layer core which was formed by two concentric layers and a clad. Tm of 2000 ppm was doped in the inner layer of the two-layer core and Eu of 2000 ppm was doped in the outer layer thereof. No dopant was doped in the clad.

The glass composition of the optical fiber, the parameter of the optical fiber, the structure of a two-layer core, and the structure of the optical fiber amplifier were the same as in the embodiment 49.

The small signal gain characteristics of the amplifier showed the same tendency as in the embodiment 49 when the pump light source was the 0.8 μm band LD, 1.2 μm band LD, and 1.58 μm band fiber laser. The signal gain of 3 dB was obtained when the pump light intensity was 100 mW in a case of the pump light source of 0.8 μm band LD. The gain coefficient was 0.045 dB/mW. The signal gain of 20 dB was obtained when the pump light intensity was 100 mW in a case of the pump light source of 1.2 μm band LD. The gain coefficient was 0.3 dB/mW. The signal gain of 22 dB was obtained when the pump light intensity was 100 mW in a case of the pump light source of 1.58 μm band fiber laser. The gain coefficient was 0.32 dB/mW.

EMBODIMENT 51

In embodiment 51 a fluoride glass fiber was used which was composed of a two-layer core which was formed by two concentric layers and a clad. Tm of 2000 ppm was doped in the inner layer of the two-layer core and Ho of 2000 ppm was doped in the outer layer thereof. No dopant was doped in the clad.

The glass composition of the optical fiber, the parameter of the optical fiber, the structure of a two-layer core, and the structure of the optical fiber amplifier were the same as in the embodiment 49.

The small signal gain characteristics of the amplifier showed the same tendency in the embodiment 49 when the pump light source was the 0.8 μm band LD, 1.2 μm band LD, and 1.58 μm band fiber laser. The signal gain of 5 dB was obtained when the pump light intensity was 100 mW in a case of the pump light source of 0.8 μm band LD. The gain coefficient was 0.07 dB/mW. No gain was obtained when the pump light intensity was 100 mW in a case of the pump light source of 1.2 μm band LD. The signal gain of 23 dB was obtained when the pump light intensity was 100 mW in a case of the pump light source of 1.58 μm band fiber laser. The gain coefficient was 0.35 dB/mW.

EMBODIMENT 52

In embodiment 52 a fluoride glass fiber was used which was composed of a two-layer core which was formed by two concentric layers and a clad. Tm of 2000 ppm was doped in the inner layer of the two-layer core and Nd of 2000 ppm was doped in the outer layer thereof. No dopant was doped in the clad.

The glass composition of the optical fiber, the parameter of the optical fiber, the structure of a two-layer core, and the structure of the optical fiber amplifier were the same as in the embodiment 49.

The small signal gain characteristics of the amplifier showed the same tendency as in the embodiment 49 when the pump light source was the 0.8 μm band LD, 1.2 μm band LD, and 1.58 μm band fiber laser. No gain was obtained when the pump light intensity was 100 mW in a case of the pump light source of 0.8 μm band LD. The signal gain of 2 dB was obtained when the pump light intensity was 100 mW in a case of the pump light source of 1.2 μm band LD. The gain coefficient was 0.03 dB/mW. The signal gain of 3 dB was obtained when the pump light intensity was 100 mW in a case of the pump light source of 1.58 μm band fiber laser. The gain coefficient was 0.045 dB/mW.

EMBODIMENT 53

In embodiment 53 a fluoride glass fiber was used which was composed of a two-layer core which was formed by two concentric layers and a clad. Tm of 2000 ppm was doped in the inner layer of the two-layer core and Dy of 2000 ppm was doped in the outer layer thereof. No dopant was doped in the clad.

The glass composition of the optical fiber, the parameter of the optical fiber, the structure of a two-layer core, and the structure of the optical fiber amplifier were the same as in the embodiment 49.

The small signal gain characteristics of the amplifier showed the same tendency as in the embodiment 49 when the pump light source was the 0.8 μm band LD, 1.2 μm band LD, and 1.58 μm band fiber laser. No gain was obtained when the pump light intensity was 100 mW in a case of the pump light source of 0.8 μm band LD. The signal gain of 8 dB was obtained when the pump light intensity was 100 mW in a case of the pump light source of 1.2 μm band LD. The gain coefficient was 0.12 dB/mW. The signal gain of 10 dB was obtained when the pump light intensity was 100 mW in a case of the pump light source of 1.58 μm band fiber laser. The gain coefficient was 0.15 dB/mW.

EMBODIMENT 54

In embodiment 54 a fluoride glass fiber was used which was composed of a two-layer core which was formed by two concentric layers and a clad. Tm of 2000 ppm was doped in the inner layer of the two-layer core and Sm of 2000 ppm was doped in the outer layer thereof. No dopant was doped in the clad.

The glass composition of the optical fiber, the parameter of the optical fiber, the structure of a two-layer core, and the structure of the optical fiber amplifier were the same as in the embodiment 49.

The small signal gain characteristics of the amplifier showed the same tendency as in the embodiment 49 when the pump light source was the 0.8 μm band LD, 1.2 μm band LD, and 1.58 μm band fiber laser. No gain was obtained when the pump light intensity was 100 mW in a case of the pump light source of 0.8 μm band LD. The signal gain of 4 dB was obtained when the pump light intensity was 100 mW in a case of the pump light source of 1.2 μm band LD. The gain coefficient was 0.06 dB/mW. The signal gain of 6 dB was obtained when the pump light intensity was 100 mW in a case of the pump light source of 1.58 μm band fiber laser. The gain coefficient was 0.1 dB/mW.

EMBODIMENT 55

In embodiment 55 a silica fiber was used which was composed of a two-layer core which was formed by two concentric layers and a clad. Tm of 2000 ppm was doped in the inner layer of the two-layer core and Tb of 2000 ppm was doped in the outer layer thereof. No dopant was doped in the clad.

The glass composition of the optical fiber and the structure of the optical fiber amplifier were the same as in the embodiment 7. The diameter of the entire core in the fiber was 4 μm and the ratio of the inner core diameter and the outer core diameter was 1:3. A specific refraction index difference was 1% and the fiber length was 80 m.

The small signal gain characteristics of the amplifier were shown when the pump light source was the 1.58 μm band fiber laser. The signal gain of 35 dB was obtained when the pump light of 200 mW was used. The gain coefficient was 0.25 dB/mW.

EMBODIMENT 56

In embodiment 56 a silica fiber was used which was composed of a two-layer core which was formed by two concentric layers and a clad. Tm of 2000 ppm was doped in the inner layer of the two-layer core and Eu of 2000 ppm was doped in the outer layer thereof. Eu of 2000 ppm was also doped in the clad. Eu ion has a small absorption rate as absorbent at 1.8 m. In the silica fiber in which it is difficult to dope many ions, great effect cannot be expected. However, by employing such a structure and by doping absorbent into the clad, it was made possible to increase the absorption effect.

The glass composition of the optical fiber, the optical fiber parameter, the structure of the two-layer core, and the structure of the optical fiber amplifier were the same as in the embodiment 55.

The signal gain of 23 dB was obtained when the pump light of 200 mW was used. The gain coefficient was 0.15 dB/mW.

EMBODIMENT 57

In embodiment 57 a silica fiber was used which was composed of a two-layer core which was formed by two concentric layers and a clad. Tm of 2000 ppm was doped in the inner layer of the two-layer core and Ho of 2000 ppm was doped in the outer layer thereof. Ho of 2000 ppm was also doped in the clad.

The glass composition of the optical fiber, the optical fiber parameter, the structure of the two-layer core, and the structure of the optical fiber amplifier were the same as in the embodiment 55.

The signal gain of 25 dB was obtained when the pump light of 200 mW was used. The gain coefficient was 0.20 dB/mW.

EMBODIMENT 58

In embodiment 58 a silica fiber was used which was composed of a two-layer core which was formed by two concentric layers and a clad. Tm of 2000 ppm was doped in the inner layer of the two-layer core and Nd of 2000 ppm was doped in the outer layer thereof. Nd of 2000 ppm was also doped in the clad.

The glass composition of the optical fiber, the optical fiber parameter, the structure of the two-layer core, and the structure of the optical fiber amplifier were the same as in the embodiment 55.

The signal gain of 10 dB was obtained when the pump light of 200 mW was used. The gain coefficient was 0.80 dB/mW.

EMBODIMENT 59

In embodiment 59 a silica fiber was used which was composed of a two-layer core which was formed by two concentric layers and a clad. Tm of 2000 ppm was doped in the inner layer of the two-layer core and Dy of 2000 ppm was doped in the outer layer thereof. Dy of 2000 ppm was also doped in the clad.

The glass composition of the optical fiber, the optical fiber parameter, the structure of the two-layer core, and the structure of the optical fiber amplifier were the same as in the embodiment 55.

The signal gain of 9 dB was obtained when the pump light of 200 mW was used. The gain coefficient was 0.075 dB/mW.

EMBODIMENT 60

In embodiment 60 a silica fiber was used which was composed of a two-layer core which was formed by two concentric layers and a clad. Tm of 2000 ppm was doped in the inner layer of the two-layer core and Sm of 2000 ppm was doped in the outer layer thereof. Sm of 2000 ppm was also doped in the clad.

The glass composition of the optical fiber, the optical fiber parameter, the structure of the two-layer core, and the structure of the optical fiber amplifier were the same as in the embodiment 55.

The signal gain of 2 dB was obtained when the pump light of 200 mW was used. The gain coefficient was 0.015 dB/mW.

EMBODIMENT 61

In embodiment 61 a fluoride fiber was used in which Tm of 2000 ppm was doped in the core and Tb of 4000 ppm was doped in the clad.

A single mode fiber (ZBLYALN fiber) having the glass composition of $ZrF_4$—$BaF_2$—$LaF_3$—$YF_3$—$AlF_3$—$LiF$—$NaF$ was used as the fluoride glass fiber. The glass composition of the used optical fiber, the structural parameter of the optical fiber, and the structure of the optical fiber amplifier were the same as in the embodiment 1 except for a portion specifically shown in this embodiment. In the embodiment, the core diameter was 1.8 μm and a specific refraction index difference was 3.7%. Three fibers of 5, 10 and 13 m in long were used.

The same structure of the amplifier as in the embodiment 1 was used. Only the case in which the pump light source of 1.2 μm band was used will be discussed below.

Figure 20:
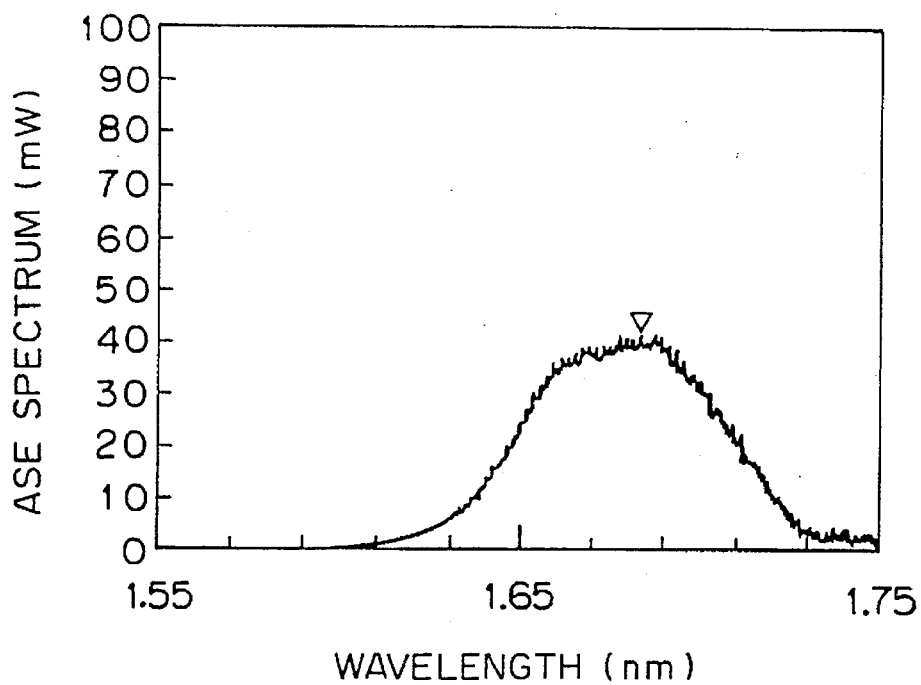
FIG. 20 is a diagram showing a spectrum of amplified spontaneous emission (ASE) light obtained from a fluoride glass fiber (a fiber in an EMBODIMENT 61) in which Tm is doped in the core and Tb is doped in the clad.

FIG. 20 shows the spectrum of ASE light obtained from these fibers. When a Tm-doped optical fiber is used, large ASE can be obtained in the 1.75 to 2.0 μm band originally. However, when the fiber according to this embodiment was used, ASE was obtained over 1.6 to 1.75 μm band having a peak at 1.67 μm as shown in FIG. 20. This means that since the Tb ions are doped in the clad, ASE is suppressed in the 1.75 to 2.0 μm band so that high efficiency amplification is made possible in the 1.65 μm band.

Figure 21:
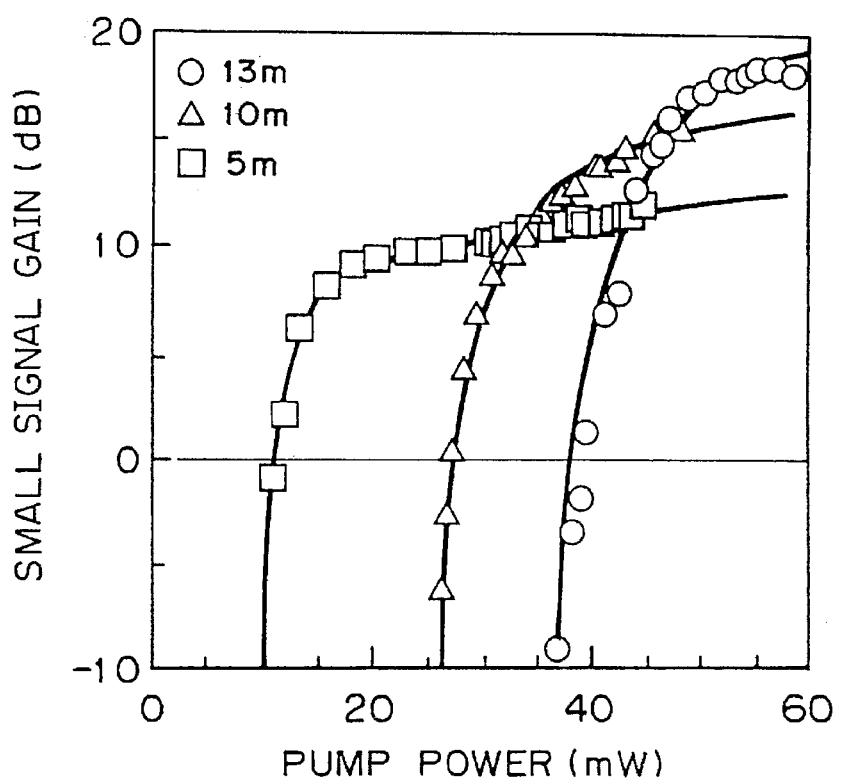
FIG. 21 is a characteristic diagram showing the small signal gain characteristic of an optical fiber amplifier in the EMBODIMENT 61.

FIG. 21 shows the small signal gain characteristics of the optical fiber amplifier using fibers having the following shapes 5 m (square), 10 m (triangle) and 13 m (circle) in length. The small signal gain of 18.5 dB was obtained in a case of fiber of 13 m in long. The gains were increased in of the fibers as the pump light intensity was increased. However, the gains were saturated when the pump light intensity was stronger than a given value. As the fiber becomes longer, the obtained gain is further increased although the pump light intensity necessary to obtain a gain, i.e., a gain threshold value and the pump light intensity when the gain changes from the increasing state to the saturating state were high. From this it could be understood that it is necessary to make the pump light intensity strong and to make the fiber long for high gain.

EMBODIMENT 62

In embodiment 62 a fluoride fiber was as used in which Tm of 2000 ppm was doped in the core and Tb of 4000 ppm was doped in the clad.

A single mode fiber (ZBLYALN fiber) having the glass composition of $ZrF_4$—$BaF_2$—$LaF_3$—$YF_3$—$AlF_3$—$LiF$—$NaF$ was used as the fluoride glass fiber. The glass composition of the used optical fiber and the structural parameter of the optical fiber were the same as in the embodiment 1 except for a portion specifically shown in this embodiment. In the embodiment, the core diameter was 1.8 m and a specific refraction index difference was 3.7%.

Figure 22:
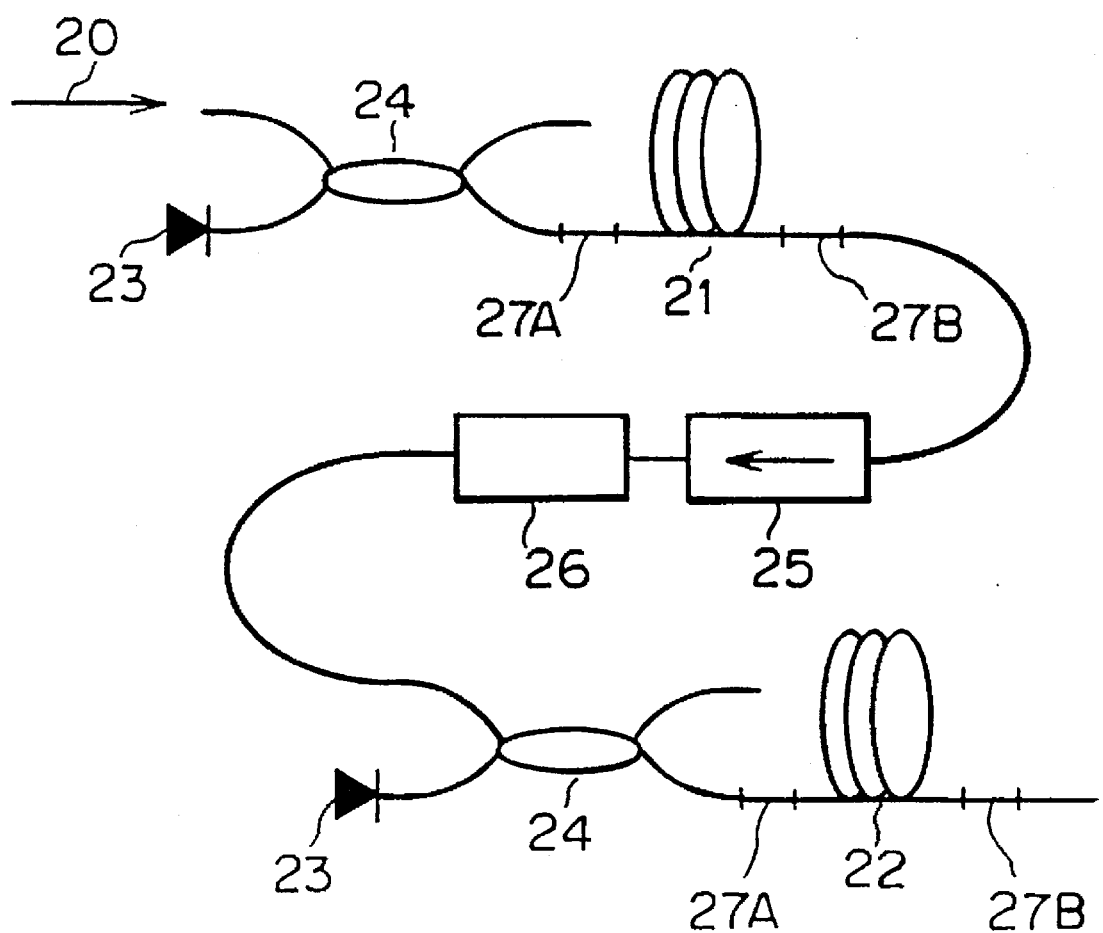
FIG. 22 is a structural diagram of an optical fiber amplifier in an EMBODIMENT 62 using a fluoride glass fiber in which Tm is doped in the core and Tb is doped in the clad.

FIG. 22 shows the structure of an optical fiber amplifier used in this embodiment. A reference numeral 20 denotes an input signal light. Two ZBLYALN fibers 21 and 22 of 13 m and 10 m in length, respectively were used as the light amplifying fluoride fiber. A 1.2 μm exciting semiconductor laser 23 and a WDM fiber coupler 24 for combining the pump light and signal light were provided at the entrance of each of the fibers. An optical isolator 25 and a band pass filter 26 of a signal light band were interposed between the two light amplifying fibers in such a manner that a large amount of ASE light of one amplifying fiber does not enter another amplifying fiber. High specific refraction index difference silica fibers 27A and 27B which have the same specific refraction difference and mode field as the fluoride fiber were connected to both ends of each fluoride fiber in order to decrease the loss due to the misalignment of mode field. In these connections, a V-shaped groove was formed to each of the ends of the fluoride fiber and high specific refraction index difference silica fiber a were adhered to each other by use of a UV adhesive. The high specific refraction index difference silica fibers 27A and 27B and the typical silica fiber were subjected to thermal expanded core (TEC) processing by a micro-burner after they were diffused and fit.

Figure 23:
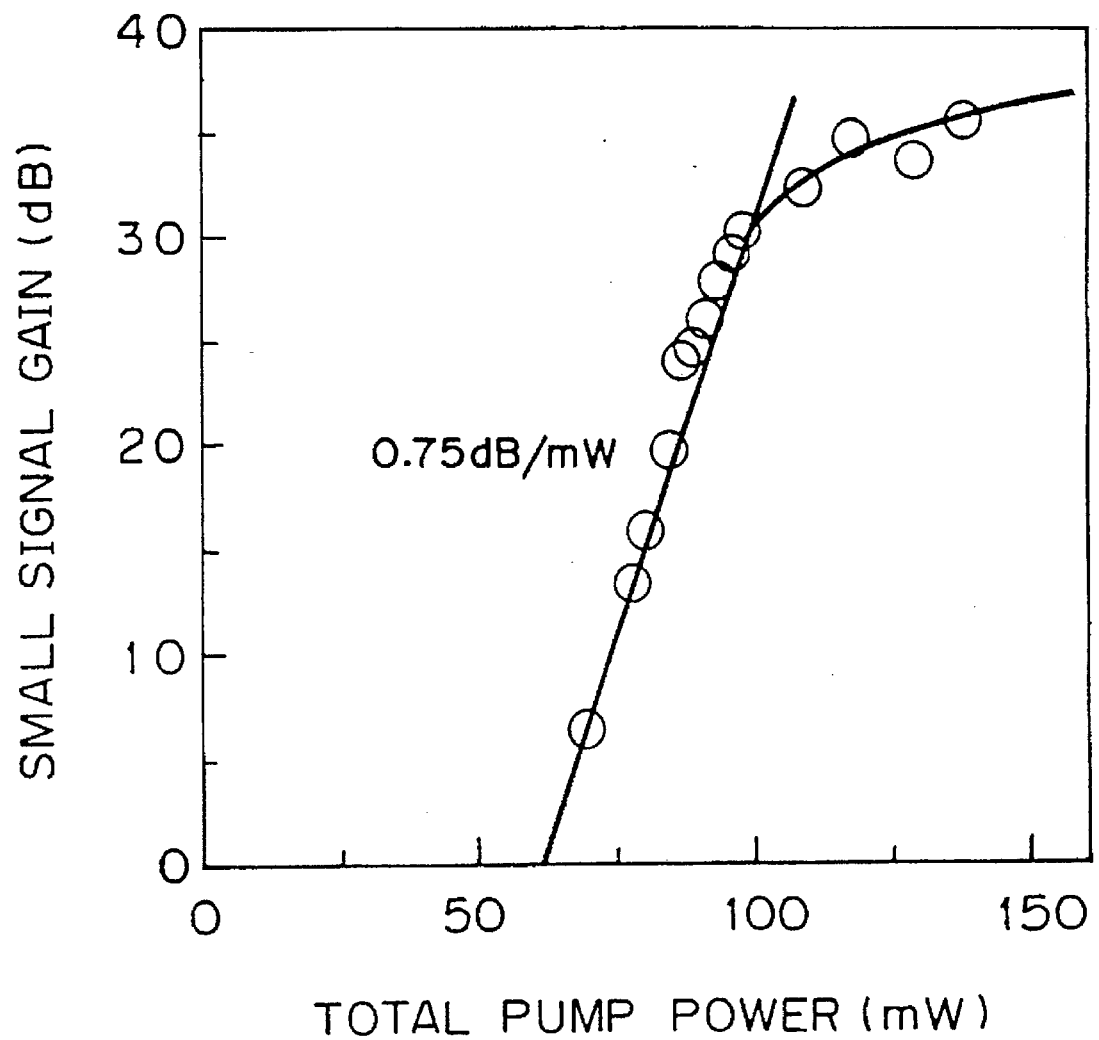
FIG. 23 is a characteristic diagram showing the small signal gain characteristic of an optical fiber amplifier in the EMBODIMENT 62.

FIG. 23 shows the small signal gain characteristics of the optical fiber amplifier using the fibers. These fiber were excited with the same pump light intensity. In FIG. 23, a total of pump light intensity was taken in the abscissa. In a case of pump light intensity of 140 mW, the small gain of 35 dB was obtained. The gain factor was 0.75 dB/mW.

Figure 24:
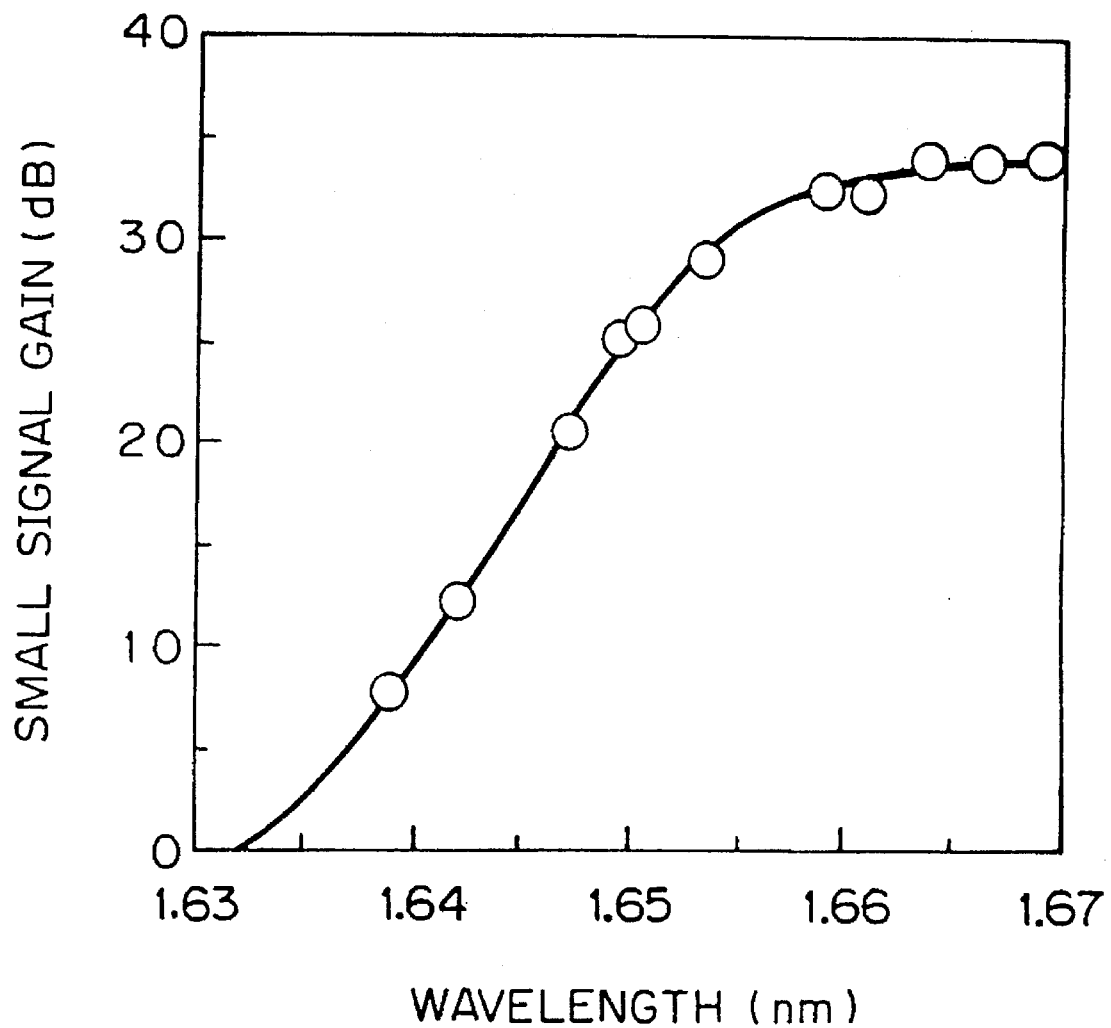
FIG. 24 is a characteristic diagram showing the gain characteristic of the optical fiber amplifier in the EMBODIMENT 62.

FIG. 24 shows a gain spectrum of the amplifier when the pump light intensity was 120 mW. As seen from the figure, a gain of more than 25 dB was obtained between 1.65 μm and 1.67 μm. The noise figure in the amplifier was 7 to 8.5 dB in the small figure amplification and the saturation output was 3 dB.

As described above, the present invention was described based on various embodiments. The effect of doping the absorbent ions could be considered other than the above-mentioned fluoride glass, silica glass, aluminium multi-component glass, and Te glass. Various modifications would be possible without departing from the scope of the present invention.

The present invention has been described in detail with respect to preferred embodiments, and it will be now be that changes and modifications may be made without departing from the invention in its broader aspects, and it is the intention, therefore, in the appended claims to cover all such changes and modifications as fall within the true spirit of the invention.

What is claimed is:

1. An amplifying optical fiber having a core composed of more than two layers, wherein Tm ions as activation ions are contained in more than one of the layers, and at least one of Tb ions and Eu ions is contained in more than one of the layers which does not contain Tm ions.

2. An amplifying optical fiber wherein Tm ions of $\alpha$ ppmw are contained in a core of said fiber, where $\alpha$ is the amount of doped Tm ions, said fiber has a confinement factor $\eta$ of light confined in the core having wavelength of 1.65 μm, Tb ions are doped in a clad of said fiber employing $(1.8 \times \alpha)/(1-\eta)$ (ppmw) as an upper limit, where the confinement factor $\eta$ is represented by $$\eta = 1 - \exp(-(a/w)^2)$$

where $w = a \times (0.46 + 1.619 V^{-1.5} + 2.879 V^{-6})$,
when the specific refraction index difference of said optical fiber is $\Delta n$, the core diameter is a, the refraction index of the core glass is $n_1$, the wavelength of input light is $\lambda$, and a normalized frequency $V = 2 \pi n_1 a (2\Delta n)^{1/2} / \lambda$.

3. An amplifying optical fiber, comprising:
    a core containing Tm ions as activation ions which provide an absorption spectrum having 1.65 μm as a center wavelength and a spontaneous emission spectrum having 1.8 μm as a center wavelength; and
    a clad containing at least one of Tb ions, Eu ions, Ho ions, Dy ions, Sm ions and Nd ions as ions directly absorbing said spontaneous emission spectrum having 1.8 μm as the center wavelength.

4. An amplifying optical fiber comprising a core composed of more than two layers and a clad surrounding said core and having a refraction index lower than that of said core, and
    wherein Tm is contained in more than one of said more than two layers of said core to provide a spontaneous emission spectrum having 1.8 μm as a center wavelength and an absorption spectrum having 1.65 μm as a center wavelength through a stimulated emission transition by pump light, and
    wherein at least one of Tb ions, Eu ions, Ho ions, Dy ions, Sm ions and Nd ions is contained in more than one of said more than two layers in which Tm is not contained, as ions directly absorbing said spontaneous emission spectrum having 1.8 μm as the center wavelength.

* * * * *